(12) United States Patent
Zhang et al.

(10) Patent No.: US 9,078,169 B2
(45) Date of Patent: Jul. 7, 2015

(54) SIGNAL FIELD DESIGN FOR WLAN

(75) Inventors: Hongyuan Zhang, Fremont, CA (US);
Raja Banerjea, Sunnyvale, CA (US);
Yong Liu, Campbell, CA (US); Sudhir Srinivasa, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 250 days.

(21) Appl. No.: 13/587,681

(22) Filed: Aug. 16, 2012

(65) Prior Publication Data
US 2013/0044743 A1 Feb. 21, 2013

Related U.S. Application Data

(60) Provisional application No. 61/524,996, filed on Aug. 18, 2011, provisional application No. 61/525,616, filed on Aug. 19, 2011, provisional application No. 61/528,656, filed on Aug. 29, 2011, provisional application No. 61/562,999, filed on Nov. 22, 2011, provisional application No. 61/565,898, filed on Dec. 1, 2011, provisional application No. 61/568,538, filed on Dec. 8, 2011.

(51) Int. Cl.
*H04L 29/02* (2006.01)
*H04W 28/18* (2009.01)
*H04L 29/06* (2006.01)
*H04L 29/08* (2006.01)
*H04W 84/12* (2009.01)

(52) U.S. Cl.
CPC ............. *H04W 28/18* (2013.01); *H04W 84/12* (2013.01); *H04L 69/22* (2013.01); *H04L 69/323* (2013.01)

(58) Field of Classification Search
CPC ... H04L 27/2602; H04L 69/323; H04L 69/22; H04W 28/18; H04W 84/12

USPC .......................................... 370/310, 328, 338
See application file for complete search history.

(56) References Cited

U.S. PATENT DOCUMENTS 7,599,332 B2 10/2009 Zelst et al.
7,742,390 B2 6/2010 Mujtaba
(Continued)

FOREIGN PATENT DOCUMENTS

WO WO-2012/122119 A1 9/2012

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

(Continued)

*Primary Examiner* — Chi H Pham
*Assistant Examiner* — Robert Lopata

(57) ABSTRACT

A method of generating packets for transmission in a wireless communication system, wherein each packet includes a SIG field that includes a first SIG subfield, includes generating a data packet and a null data packet. Generating the data packet includes generating information bits of the first SIG subfield of the data packet and generating the data portion of the data packet. The information bits of the first SIG subfield of the data packet indicate, to a receiving device, a length corresponding to a data portion of the data packet. Generating the null data packet includes generating information bits of the first SIG subfield of the null data packet. The information bits of the first SIG subfield of the null data packet indicate, to a receiving device, a first physical layer (PHY) parameter value associated with the null data packet. The first PHY parameter value is not a length value.

14 Claims, 12 Drawing Sheets

(56) References Cited

U.S. PATENT DOCUMENTS

| | | | |
|---|---|---|---|
| 8,270,909 B2* | 9/2012 | Zhang et al. | 455/69 |
| 8,619,907 B2 | 12/2013 | Mujtaba et al. | |
| 8,743,784 B2* | 6/2014 | Sampath et al. | 370/328 |
| 2009/0196163 A1 | 8/2009 | Du | |
| 2010/0046358 A1 | 2/2010 | van Nee | |
| 2010/0046656 A1 | 2/2010 | van Nee et al. | |
| 2010/0091673 A1 | 4/2010 | Sawai et al. | |
| 2010/0260159 A1 | 10/2010 | Zhang et al. | |
| 2010/0309834 A1 | 12/2010 | Fischer et al. | |
| 2011/0002219 A1 | 1/2011 | Kim et al. | |
| 2011/0032875 A1 | 2/2011 | Erceg et al. | |
| 2011/0128929 A1* | 6/2011 | Liu et al. | 370/329 |
| 2011/0128947 A1* | 6/2011 | Liu et al. | 370/338 |
| 2012/0033614 A1* | 2/2012 | Sampath et al. | 370/328 |
| 2012/0076179 A1* | 3/2012 | Stacey et al. | 375/219 |
| 2012/0120839 A1* | 5/2012 | Liu et al. | 370/252 |
| 2012/0195391 A1 | 8/2012 | Zhang et al. | |
| 2012/0201315 A1* | 8/2012 | Zhang et al. | 375/260 |
| 2012/0201316 A1 | 8/2012 | Zhang et al. | |
| 2012/0269183 A1* | 10/2012 | Sohn et al. | 370/338 |
| 2012/0294255 A1* | 11/2012 | Seok et al. | 370/329 |
| 2012/0294294 A1 | 11/2012 | Zhang | |
| 2012/0300874 A1* | 11/2012 | Zhang | 375/295 |
| 2012/0314869 A1 | 12/2012 | Zhang et al. | |
| 2013/0044687 A1 | 2/2013 | Liu et al. | |
| 2013/0235836 A1* | 9/2013 | Roh et al. | 370/329 |

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2012.

IEEE Std 802.11af/D1.05 "Draft Standard for Information Technology—Telecommunications and Information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, Nov. 2011.

Park, "Proposed Specification Framework for TGah", *The Institute of Electrical and Electronics Engineers*, doc. No. IEEE 802.11-11/1137r6, (Mar. 2012).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, (1999).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Mar. 2012.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

International Search Report and Written Opinion in corresponding PCT/US2012/051184 dated Nov. 23, 2012.

International Preliminary Report on Patentability in corresponding PCT/US2012/051184 dated Feb. 18, 2014.

Mangold et al., "IEEE 802.11e Wireless LAN for Quality of Service," Proceedings of the European Wireless, vol. 1, pp. 32-39, Feb. 1, 2002.

Stacey et al., "Specification Framework for TGac," document No. IEEE 802.11-09/0992r20, *Institute for Electrical and Electronics Engineers*, pp. 1-49, Jan. 18, 2011.

Office Action in U.S. Appl. No. 13/587,667, mailed Jun. 3, 2014 (13 pages).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009),*The Institute of Electrical and Electronics Engineers*, pp. 207-211 (2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Shi et al., "Phase Tracking During VHT-LTF," Doc. No. IEEE 802.11-10/0771r0, *The Institute of Electrical and Electronics Engineers, Inc.*, Jul. 2010.

(56) References Cited

OTHER PUBLICATIONS van Zelst et al., "Pilot Sequence for VHT-DATA," Doc. No. IEEE 802.11-10/0811r1, *The Institute of Electrical and Electronics Engineers, Inc.*, Jul. 2010.

Lee et al., "TGaf PHY proposal," The Institute of Electrical and Electronics Engineers, doc. No. IEEE 802.11-12/0809r5, pp. 1-43, Jul. 10, 2012.

Yu et al., "Coverage extension for IEEE802.11ah," The Institute of Electrical and Electronics Engineers, doc. No. IEEE 802.11-11/0035r1, pp. 1-10 (Jan. 2011).

Taghavi et al., "Introductory Submission for TGah", doc. No. IEEE 802.11-11/0062r0, Institute for Electrical and Electronics Engineers, pp. 1-5 (Jan. 14, 2011).

de Vegt, "Potential Compromise for 802.11ah Use Case Document", Institute of Electrical and Electronics Engineers, doc. No. IEEE 802.11-11/0457r0, pp. 1-27 (Mar. 2011).

Zhang et al., "11ah Data Transmission Flow," The Institute of Electrical and Electronics Engineers, doc. No. IEEE 802.11-11/1484r1, pp. 1-15 (Nov. 2011).

Park, "Proposed Specification Framework for TGah", The Institute of Electrical and Electronics Engineers, doc. No. IEEE 802.11-11/1137r6, pp. 1-13 (Mar. 2012).

Park, "Proposed Specification Framework for TGah D9.x", The Institute of Electrical and Electronics Engineers, doc. No. IEEE 802.11-yy/xxxxr0, pp. 1-30 (Jul. 2012).

Vermani, et al. "Preamble Format for 1 MHz," The Institute of Electrical and Electronics Engineers, doc. No. IEEE 802.11-11/1482r2, pp. 1-30 (Nov. 2011).

Zhang et al., "1MHz Waveform in Wider BW", The Institute of Electrical and Electronics Engineers, doc. No. IEEE 802.11-12/0309r1, pp. 1-10 (Mar. 2012).

Vermani, et al. "Spec Framework Text for PHY Numerology," The Institute of Electrical and Electronics Engineers, doc. No. IEEE 802.11-11/1311r0, pp. 1-5 (Sep. 2011).

Shao, "Channel Selection for 802.11ah," doc.: IEEE 802.11-12/0816r0, pp. 1-11 (Jul. 2012).

Zhang, H., et al., U.S. Appl. No. 13/085,134, filed Apr. 12, 2011 entitled "Error Detection in a Signal Field of a WLAN Frame Header," (48 pages).

\* cited by examiner

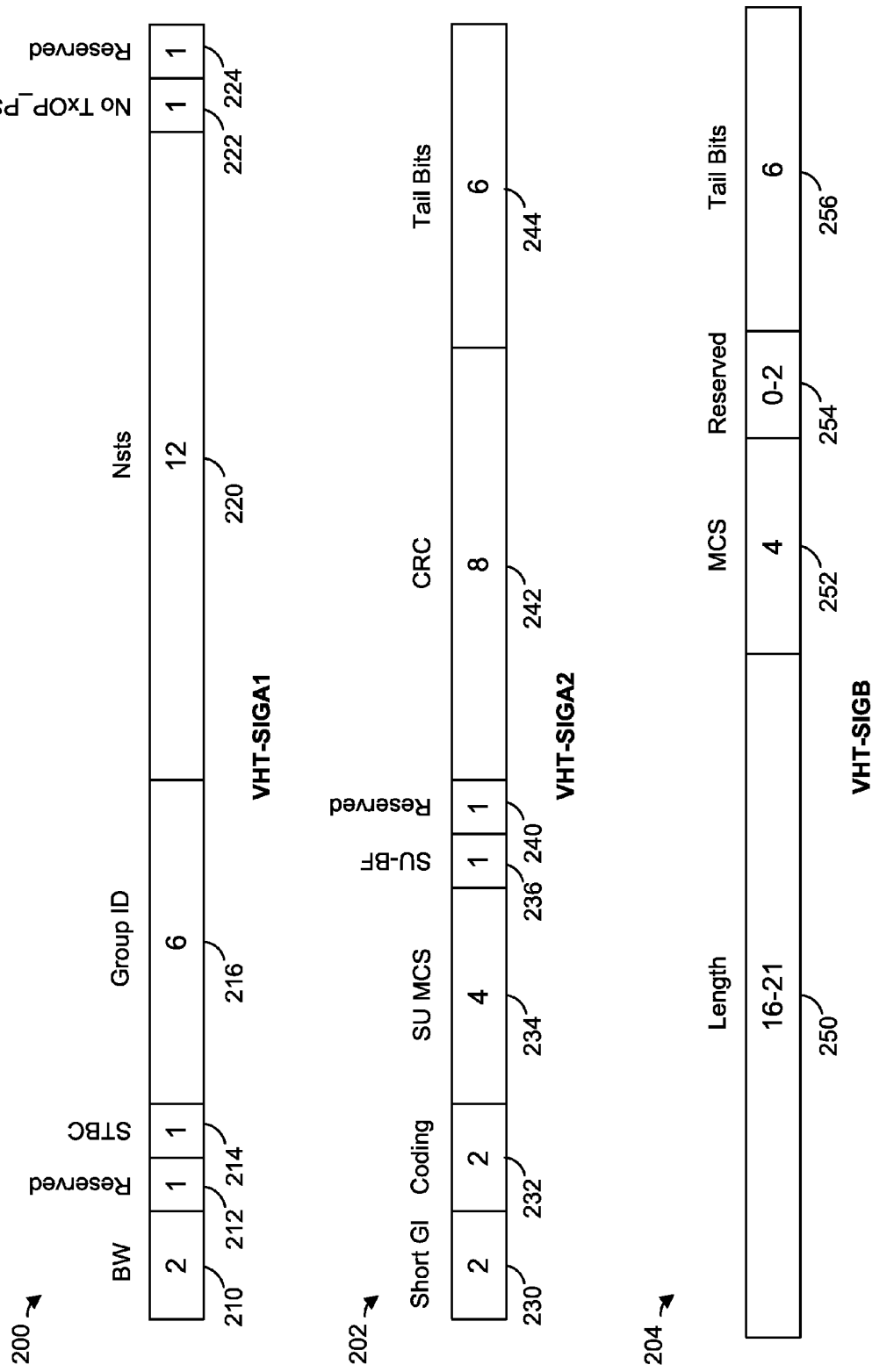

Regular mode (SU)

Regular mode (MU)

Low rate mode

SIGNAL FIELD DESIGN FOR WLAN

CROSS-REFERENCE TO RELATED APPLICATIONS

This disclosure claims the benefit of the following U.S. Provisional Patent Applications:

U.S. Provisional Patent Application No. 61/524,996, entitled "Reduce SIG Field," filed on Aug. 18, 2011;

U.S. Provisional Patent Application No. 61/525,616, entitled "Signal Field Design for TGah," filed on Aug. 19, 2011;

U.S. Provisional Patent Application No. 61/528,656, entitled "Signal Field Design for TGah," filed on Aug. 29, 2011;

U.S. Provisional Patent Application No. 61/562,999, entitled "Signal Field Design for TGah," filed on Nov. 22, 2011;

U.S. Provisional Patent Application No. 61/565,898, entitled "Signal Field Design for TGah," filed on Dec. 1, 2011; and U.S. Provisional Patent Application No. 61/568,538, entitled "Signal Field Design for TGah," filed on Dec. 8, 2011.

The disclosures of all of the above-referenced patent applications are hereby incorporated by reference herein in their entireties.

The present application is related to U.S. patent application Ser. No. 13/587,667, entitled "Signal Field Design for WLAN," filed on the same day as the present application, and hereby incorporated by reference herein in its entirety.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the Gbps range.

Work has begun on two new standards, IEEE 802.11ah and IEEE 802.11af, each of which will specify wireless network operation in sub-1 GHz frequencies. Low frequency communication channels are generally characterized by better propagation qualities and extended propagation ranges compared to higher frequency communication channels. In the past, sub-1 GHz frequency ranges have not been utilized for wireless communication networks because such frequencies were reserved for other applications (e.g., licensed TV frequency bands, radio frequency band, etc.). There are few frequency bands in the sub-1 GHz range that remain unlicensed, with different unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands. Because communications in the sub-1 GHz frequency bands have a relatively low data rate, a physical layer (PHY) data unit with a long preamble will significantly increase the duration of time it takes to transmit the data unit.

SUMMARY

In one embodiment, a method of generating a plurality of packets, including data packets and null data packets, for transmission in a wireless communication system, wherein each of the data packets includes a data portion having at least a minimum length greater than zero, each of the null data packets does not include a data portion, each packet of the plurality of packets includes a signal (SIG) field, and the SIG field of each packet includes a first SIG subfield, includes generating a first data packet of the plurality of packets. Generating the first data packet includes generating information bits of the first SIG subfield of the first data packet and generating the data portion of the first data packet. The information bits of the first SIG subfield of the first data packet indicate, to a receiving device, a first length corresponding to a data portion of the first data packet. The first length is at least the minimum length. The method also includes generating a first null data packet of the plurality of packets. Generating the first null data packet includes generating information bits of the first SIG subfield of the first null data packet. The information bits of the first SIG subfield of the first null data packet indicate, to a receiving device, a first physical layer (PHY) parameter value associated with the first null data packet. The first PHY parameter value is not a length value.

In another embodiment, a communication device includes a network interface configured to generate a plurality of packets, including data packets and null data packets. Each of the data packets includes a data portion having at least a minimum length greater than zero, each of the null data packets does not include a data portion, each packet of the plurality of packets includes a signal (SIG) field, and the SIG field of each packet includes a first SIG subfield. The network interface is configured to generate the plurality of packets at least in part by generating a data packet of the plurality of packets and by generating a null data packet of the plurality of packets. The network interface is configured to generate the data packet of the plurality of packets at least in part by generating information bits of the first SIG subfield of the data packet and by generating the data portion of the data packet. The information bits of the first SIG subfield of the data packet indicate, to a receiving device, a first length corresponding to a data portion of the data packet. The first length is at least the minimum length. The network interface is configured to generate the null data packet of the plurality of packets at least in part by generating information bits of the first SIG subfield of the null data packet. The information bits of the first SIG subfield of the null data packet indicate, to a receiving device, a first physical layer (PHY) parameter value associated with the null data packet. The first PHY parameter value is not a length value.

In another embodiment, a method of detecting physical layer (PHY) information in received packets includes receiving a plurality of packets including data packets and null data packets. Each of the data packets includes a data portion having at least a minimum length greater than zero, each of the null data packets does not include a data portion, each packet of the plurality of packets includes a signal (SIG) field, and the SIG field of each packet includes a first SIG subfield. The method also includes determining, based on information bits in the first SIG subfield of a first packet of the plurality of packets, that the first packet is a data packet including a data portion having a first length equal to or greater than the minimum length. The method also includes determining, based on information bits in the first SIG subfield of a second packet of the plurality of packets, that the second packet is a null data packet associated with a first PHY parameter value. The first PHY parameter value is not a length value. The method also includes determining, based on information bits in the first SIG subfield of a third packet of the plurality of packets, that the third packet is a null data packet associated with a second PHY parameter value. The second PHY parameter value (i) is not a length value and (ii) is different than the first PHY parameter value.

In another embodiment, a communication device includes a network interface configured to receive a plurality of packets including data packets and null data packets. Each of the data packets includes a data portion having at least a minimum length greater than zero, each of the null data packets does not include a data portion, each packet of the plurality of packets includes a signal (SIG) field, and the SIG field of each packet includes a first SIG subfield. The network interface is also configured to determine that a respective packet of the plurality of packets is (i) a data packet including a data portion having a first length equal to or greater than the minimum length when the first SIG subfield of the respective packet includes a first set of information bits, (ii) a null data packet associated with a first PHY parameter value when the first SIG subfield of the respective packet includes a second set of information bits different than the first set of information bits, or (iii) a null data packet associated with a second PHY parameter value different than the first PHY parameter value when the first SIG subfield of the respective packet includes a third set of information bits different than the first set of information bits and the second set of information bits. The first PHY parameter value is not a length value, and the second PHY parameter value is not a length value.

BRIEF DESCRIPTION OF THE DRAWINGS

FIG. 5 is a diagram of SIG field formats as defined by the IEEE 802.11ac Standard, now being developed.

DETAILED DESCRIPTION

Figure 1:
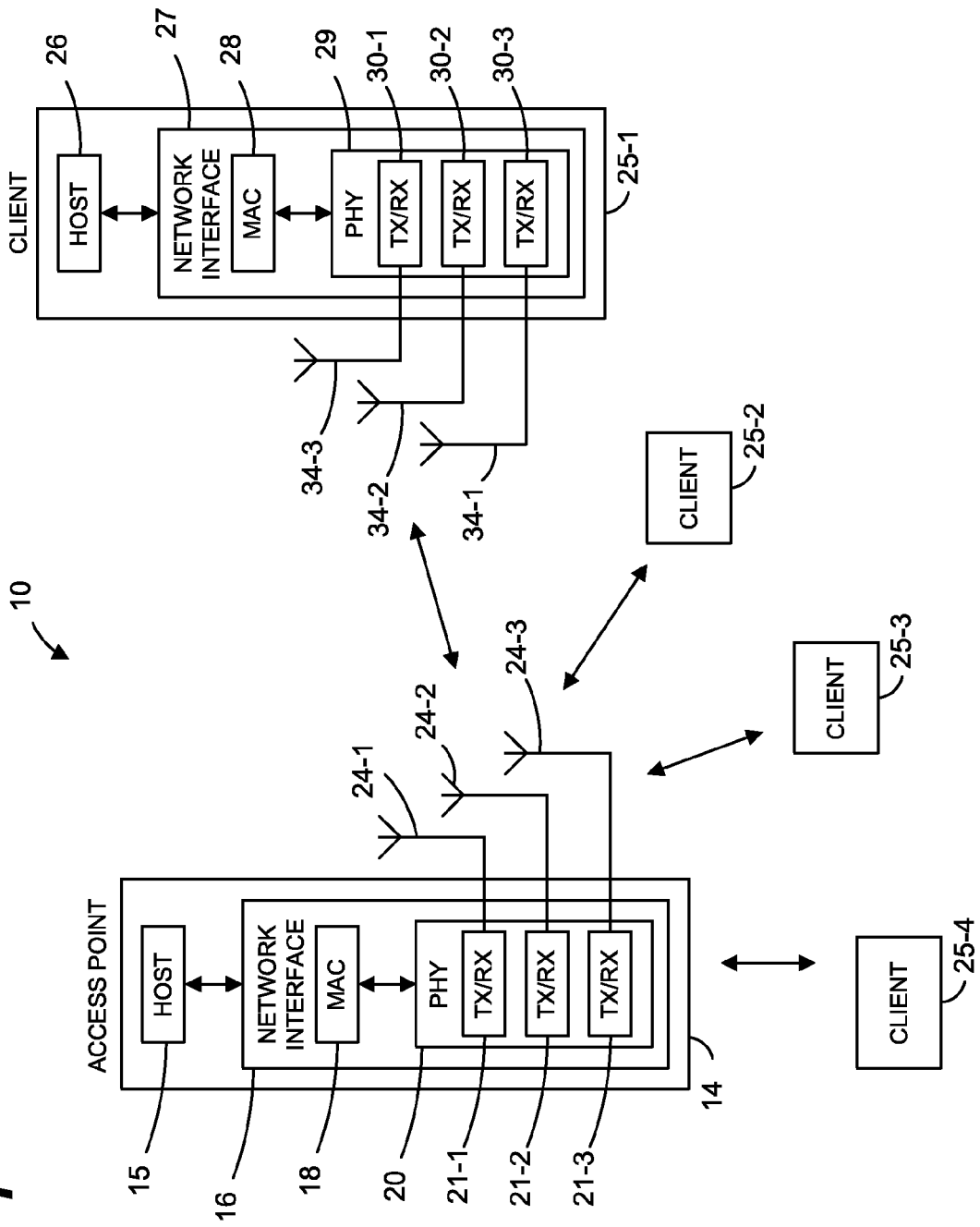
FIG. 1 is a block diagram of an example wireless local area network (WLAN), according to an embodiment.

In embodiments described below, a wireless network device such as an access point (AP) of a wireless local area network (WLAN) transmits data streams to, and/or receives data streams from, one or more client stations. The AP is configured to communicate with client stations according to at least a first communication protocol. The first communication protocol defines operation in a sub-1 GHz frequency range, and is typically used for applications requiring long range wireless communication with relatively low data rates. The first communication protocol (e.g., IEEE 802.11af or IEEE 802.11ah) is referred to herein as a "long range" communication protocol. In some embodiments, the AP is also configured to communicate with client stations according to one or more other communication protocols which define operation in generally higher frequency ranges and are typically used for closer-range communications with higher data rates. The higher frequency communication protocols (e.g., IEEE 802.11a, IEEE 802.11n, and/or IEEE 802.11ac) are collectively referred to herein as "short range" communication protocols.

In various embodiments, the long range communication protocol defines one or more physical layer (PHY) data unit formats the same as or similar to a PHY data unit format defined by one or more of the short range communication protocols. In one embodiment, to support communication over a longer range, and also to accommodate typically smaller bandwidth channels available at lower (sub-1 GHz) frequencies, the long range communication protocol defines PHY data units having a format that is similar to a PHY data unit format defined by a short range communication protocol, but generated using a lower clock rate. In an embodiment, the AP operates at a clock rate suitable for short range, high throughput operation, and down-clocking is used to generate a new clock signal to be used for the sub-1 GHz operation. As a result, in this embodiment, a PHY data unit that conforms to the long range communication protocol (at times referred to herein as a "long range data unit") maintains a PHY format of a data unit that is similar to a short range communication protocol (at times referred to herein as a "short range data unit"), but is transmitted over a longer period of time. Additionally, in some embodiments, the long range communication protocol defines one or more additional communication modes having even lower data rates and intended for extended range operations. For example, in an embodiment, the long range communication protocol defines a "regular" or "normal" mode (referred to herein as regular mode) that corresponds to one or more signal bandwidths, as well as a "low rate" mode that extends communication range and improves receiver sensitivity. In some embodiments, the low rate mode utilizes a smaller bandwidth than regular mode data units (e.g., by generating the data units at the same clock rate but using a smaller inverse fast Fourier transform (FFT) size, in an embodiment), and may therefore be referred to herein as a "low bandwidth" mode. In some embodiments, the low rate mode is used as a control mode.

In some embodiments, due to a slower clock rate and longer transmission times, long range data units have a lower upper limit on the number of payload data bits that can be transmitted as compared to short range data units. As a result, in some of these embodiments, the degree of overhead caused by the PHY information in a signal (SIG) field of a long range data unit is much greater than the degree of overhead caused by such information in a short range data unit. Moreover, in some embodiments, because long range data units in low rate mode include fewer data bits per orthogonal frequency division multiplexing (OFDM) symbol than long range data units in regular mode, a SIG field of a given length takes more time to transmit in low rate mode than in regular mode. Thus, at least in some embodiments and scenarios, SIG field bits are at a higher premium in long range data units than in short range data units, and/or at a higher premium in low rate mode than in regular mode.

Various SIG field formats are described below according to different example embodiments. In some of these embodiments, SIG fields of long range data units have a significantly reduced bit count relative to SIG fields of short range data units. In other embodiments, SIG fields of long range data units in low rate mode have a significantly reduced bit count relative to SIG fields of long range data units in regular mode. In some embodiments, the SIG field bit count is reduced by overloading each of one or more SIG subfields with multiple types of PHY information.

FIG. 1 is a block diagram of an example WLAN 10 including an AP 14, according to an embodiment. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the long range communication protocol (e.g., regular mode and/or low rate mode data units according to the long range communication protocol) and having formats described hereinafter. The transceiver(s) 21 is/are configured to transmit the generated data units via the antenna(s) 24. Similarly, the transceiver(s) 21 is/are configured to receive the data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol (e.g., regular mode and/or low rate mode data units according to the long range communication protocol) and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

A brief description of various prior art PHY data unit formats, including the SIG field formats of the data units, is provided below as background with reference to FIGS. 2-5.

Figure 2:
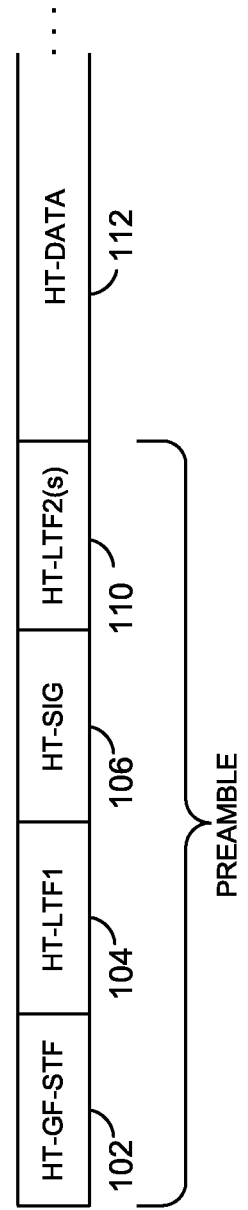
FIG. 2 is a diagram of a short range physical layer (PHY) data unit format as defined by the IEEE 802.11n Standard.

FIG. 2 is a diagram of a prior art short range PHY data unit 100 specified by the IEEE 802.11n Standard. The PHY data unit 100 corresponds to a "Greenfield" mode designed for scenarios where the WLAN does not include any client stations that conform to the IEEE 802.11a Standard but not the IEEE 802.11n Standard. The IEEE 802.11n Standard also defines a "mixed mode" PHY data unit format (not shown in FIG. 2) that includes certain legacy fields arranged according to the IEEE 802.11a Standard. The PHY data unit 100 includes a preamble having a short training field (HT-GF-STF) 102, generally used for packet detection, initial synchronization, and automatic gain control, etc., and a first long training field (HT-LTF1) 104, generally used for channel estimation and fine synchronization. The preamble also includes a signal (SIG) field (HT-SIG) 106, used to carry certain PHY parameters associated with the PHY data unit 100, such as modulation type and coding rate used to transmit the PHY data unit 100, for example. If more than one spatial stream is used to transmit the PHY data unit 100 for multiple input multiple output (MIMO) operation, the preamble also includes one or more additional LTFs (HT-LTF2(s)) 110. In addition to the preamble, the PHY data unit 100 includes a data portion (HT-DATA) 112. The PHY data unit 100 may be transmitted in a 20 or 40 MHz bandwidth channel.

Figure 3:
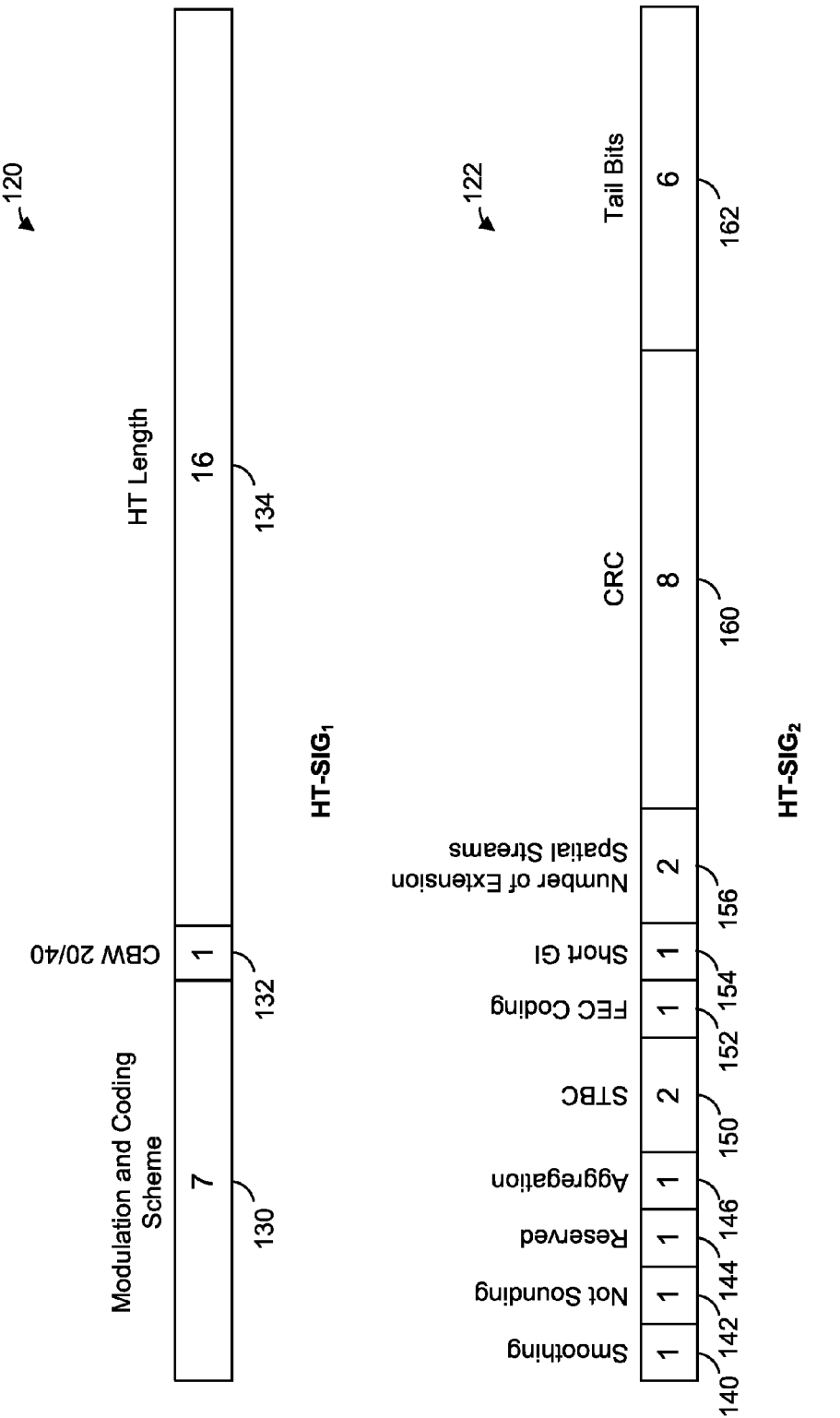
FIG. 3 is a diagram of a signal (SIG) field format as defined by the IEEE 802.11n Standard.

FIG. 3 is a diagram of a prior art format of the SIG field 106 of the PHY data unit 100 of FIG. 2, as specified by the IEEE 802.11n Standard. As seen in FIG. 3, the SIG field 106 of the PHY data unit 100 of FIG. 2 includes a first OFDM symbol (HT-SIG$_1$) 120 and a second OFDM symbol (HT-SIG$_2$) 122. The first OFDM symbol 120 of the SIG field 106 includes a modulation and coding scheme (MCS) subfield 130, a channel bandwidth subfield (CBW 20/40) 132, and a length subfield (HT Length) 134. The second OFDM symbol 122 of the SIG field 106 includes a smoothing subfield 140, a "not sounding" subfield 142, a reserved subfield 144, an aggregation subfield 146, a space-time block code (STBC) subfield 150, a forward error correction (FEC) coding subfield 152, a short guard interval (GI) subfield 154, a number of extension spatial streams subfield 156, a cyclic redundancy check (CRC) subfield 160, and a tail bits subfield 162. Generally, for subfields where least and most significant bits are applicable (e.g., MCS subfield 130, length subfield 134, STBC subfield 150, etc.), the least significant bit (LSB) of each subfield is the left-most bit of FIG. 3, and the most significant bit (MSB) is the right-most bit.

The MCS subfield 130 includes seven information bits that indicate an index value corresponding to a particular number of spatial streams, modulation type (e.g., binary phase shift keying (BPSK), quadrature phase shift keying (QPSK), etc.), and coding rate (e.g., ½, ¾, etc.). The channel bandwidth subfield 132 includes one information bit that indicates whether the bandwidth of PHY data unit 100 is 20 MHz or 40 MHz. The length subfield 134 includes 16 information bits that indicate the length in bytes (octets) in the data portion 112 of the PHY data unit 100. The smoothing subfield 140 includes one information bit that indicates whether channel estimate smoothing is permitted (as opposed to independent, per-carrier smoothing). The "not sounding" subfield 142 includes one information bit that indicates whether the PHY data unit 100 is a sounding PHY data unit (i.e., an NDP). The reserved subfield 144 includes one information bit that the IEEE 802.11n Standard does not assign to any PHY parameter. The aggregation subfield 146 includes one information bit that indicates whether the data portion 112 of the PHY data unit 100 includes an aggregate MAC protocol data unit (A-MPDU). The STBC subfield 150 includes two information bits that indicate whether STBC is utilized for the PHY data unit 100 and, if STBC is utilized, to indicate the difference between the number of spatial streams ($N_{SS}$) indicated by the index value in MCS subfield 130 and the number of space-time streams ($N_{STS}$). The FEC coding subfield 152 includes one information bit that indicates whether the PHY data unit 100 is coded using binary convolutional coding (BCC) or low-density parity check (LDPC) coding. The short GI subfield 154 includes one information bit that indicates whether a short or long guard interval is utilized. The number of extension spatial streams subfield 156 includes two information bits that indicate the number of extension spatial streams ($N_{ESS}$). The CRC subfield 160 includes eight information bits that include the CRC of the information bits in the first OFDM symbol 120 of the SIG field 106, and the CRC of the first 10 information bits in the second OFDM symbol 122 of the SIG field 106. Finally, the tail bits subfield 162 includes six tail bits.

Figure 4:
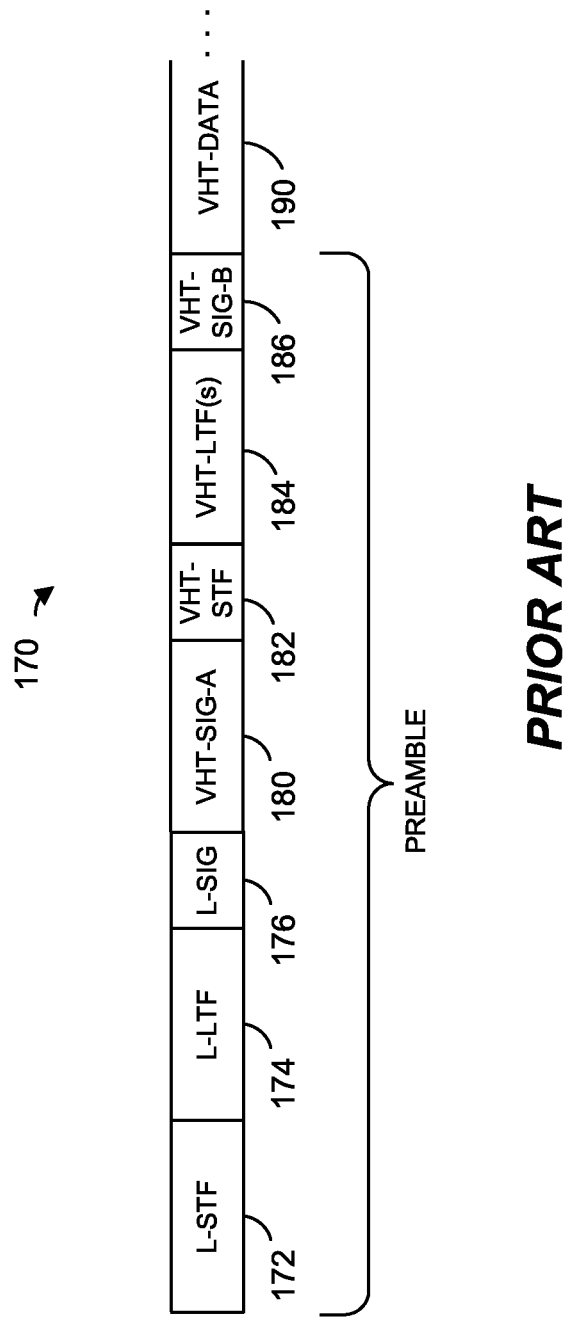
FIG. 4 is a diagram of a short range PHY data unit format as defined by the IEEE 802.11ac Standard, now being developed.

FIG. 4 is a diagram of a prior art short range PHY data unit 170 specified by the IEEE 802.11ac Standard, now being developed. Because IEEE 802.11ac supports mixed mode operation, the PHY data unit 170 includes a preamble having a legacy STF (L-STF) 172, a legacy LTF (L-LTF) 174, and a legacy SIG field (L-SIG) 176. The preamble also includes a first very high throughput (VHT) SIG field (VHT-SIG-A) 180, a VHT STF 182, one or more VHT LTFs 184 corresponding to the number of spatial streams used to transmit the PHY data unit 170, and a second VHT SIG field (VHT-SIG-B) 186. For multi-user (MU) data units, the first VHT SIG field 180 contains PHY information for all users (e.g., bandwidth of the PHY data unit 170), while the second VHT SIG field 186 contains PHY information specific to various users (e.g., the MCS corresponding to each user). In addition to the preamble, the PHY data unit 170 includes a data portion (VHT-DATA) 190. The PHY data unit 170 may be transmitted in a 20, 40, 80, or 160 MHz bandwidth channel.

FIG. 5 is a diagram of a prior art format of the VHT SIG fields 180 and 186 of the PHY data unit 170 of FIG. 4, as specified by the IEEE 802.11ac Standard. As seen in FIG. 5, the first VHT SIG field 180 of the PHY data unit 170 of FIG. 4 includes a first OFDM symbol (VHT-SIGA1) 200 and a second OFDM symbol (VHT-SIGA2) 202, and the second VHT SIG field 186 of the PHY data unit 170 of FIG. 4 includes only a single OFDM symbol (VHT-SIGB) 204. The first OFDM symbol 200 of the first VHT SIG field 180 includes a bandwidth (BW) subfield 210, a reserved subfield 212, an STBC subfield 214, a group ID subfield 216, a number of space-time streams ($N_{STS}$) subfield 220, a "no power save" (No TxOP_PS) subfield 222, and another reserved subfield 224. The second OFDM symbol 202 of the first VHT SIG field 180 includes a short GI subfield 230, a coding subfield 232, a single-user (SU) MCS subfield 234, an SU beamforming (SU-BF) subfield 236, a reserved subfield 240, a CRC subfield 242, and a tail bits subfield 244. The OFDM symbol 204 of the second VHT SIG field 186 includes a length subfield 250, an MCS subfield 252, a reserved subfield 254, and a tail bits subfield 256. Generally, for subfields where least and most significant bits are applicable, the LSB of each subfield is the left-most bit of FIG. 5, and the MSB is the right-most bit.

In the first OFDM symbol 200 of the first VHT SIG field 180, the BW subfield 210 includes two information bits that indicate whether the bandwidth of PHY data unit 170 is 20 MHz, 40 MHz, 80 MHz, or 160 MHz. The reserved subfield 212 includes one information bit that the IEEE 802.11ac Standard does not currently assign to any PHY parameter. The STBC subfield 214 includes one information bit indicating whether STBC is utilized for the PHY data unit 170. The group ID subfield 216 includes six information bits indicating a group ID to facilitate the sharing of a transmit opportunity for multiple users when the PHY data unit 170 is an MU PHY data unit. When PHY data unit 170 is an SU PHY data unit, the information bits of the group ID subfield 216 are all set to one. The $N_{STS}$ subfield 220 includes 12 information bits. When PHY data unit 170 is an SU PHY data unit, three of the information bits indicate the number of space-time streams and nine of the information bits indicate the "partial AID" (i.e., a value based on a basic service set identifier (BSSID) and an association identifier (AID) of the receiving device). When PHY data unit 170 is an MU PHY data unit, three of the information bits indicate the $N_{STS}$ for each of up to four users. The "no power save" subfield 222 includes one information bit that indicates whether a power save mode is permitted. The reserved subfield 224 includes one information bit that the IEEE 802.11ac Standard does not currently assign to any PHY parameter.

In the second OFDM symbol 202 of the first VHT SIG field 180, the short GI subfield 230 includes two information bits that indicate whether a short or long guard interval is utilized and, because use of a short GI can introduce some ambiguity as to packet duration, whether the PHY data unit 170 includes an additional OFDM symbol. The coding subfield 232 includes two information bits that indicate the type of FEC coding and, because use of LDPC can introduce some ambiguity as to packet duration, whether the PHY data unit 170 includes an additional OFDM symbol. The SU MCS subfield 234 includes four information bits that indicate an index value corresponding to a particular modulation type and coding rate when the PHY data unit 170 is an SU PHY data unit. When the PHY data unit 170 is instead an MU PHY data unit, the SU MCS subfield 234 can be used to indicate other PHY information related to MU operation. The SU BF subfield 236 includes one information bit indicating whether a beamforming matrix is applied to the signal corresponding to the data unit 170. The reserved subfield 240 includes one information bit that the IEEE 802.11ac Standard does not currently assign to any PHY parameter. The CRC subfield 242 includes eight information bits that include the CRC of the information bits in the first OFDM symbol 200 of the first VHT SIG field 180, and the CRC of the first 10 information bits in the second OFDM symbol 202 of the first VHT SIG field 180. The tail bits subfield 244 includes six tail bits.

In the OFDM symbol 204 of the second VHT SIG field 186, the length subfield 250 includes 16 to 21 information bits (depending on channel bandwidth) that indicate the user-specific length of the data portion in multiples of four bytes. The MCS subfield 252 includes four information bits that indicate the MCS index of PHY data unit 170. The reserved subfield 254 is either omitted, or includes one to two information bits that the IEEE 802.11ac Standard does not currently assign to any PHY parameter, depending on channel bandwidth. The tail bits subfield 256 includes six tail bits.

Figure 6A:
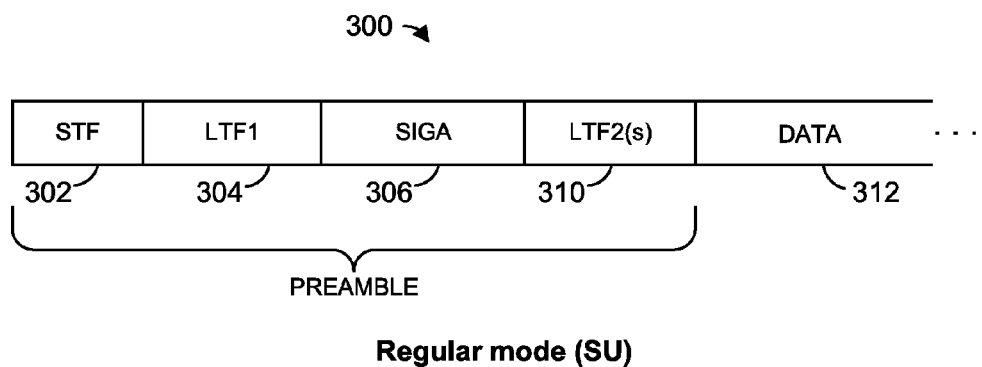
FIGS. 6A-6C are diagrams of example long range PHY data unit formats corresponding to different modes of operation, according to an embodiment.
Figure 6B:
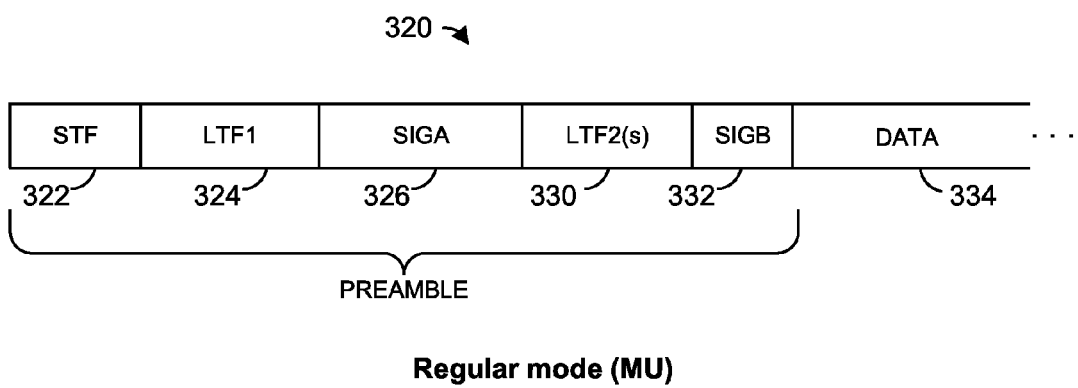
Figure 6C:
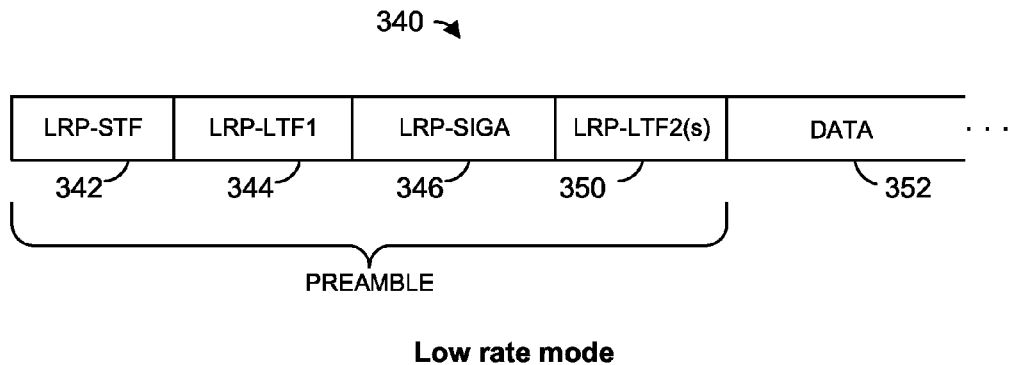

FIGS. 6A-6C are diagrams of example long range data unit formats corresponding to different modes of operation, according to an embodiment. In particular, FIG. 6A is a diagram of an example single-user (SU), regular mode, long range PHY data unit 300, FIG. 6B is a diagram of an example multi-user (MU), regular mode, long range PHY data unit 320, and FIG. 6C is a diagram of an example low rate mode, long range PHY data unit 340, according to an embodiment. With reference to FIG. 1, the AP 14 is configured to transmit PHY data units having the format of PHY data units 300, 320, and/or 340 to the client station 25-4 using OFDM modulation, according to an embodiment. In an embodiment, the client station 25-4 is also configured to transmit PHY data units having the format of PHY data units 300 and/or 340 to the AP 14 using OFDM modulation.

Generally, long range data units extend the range of communication as compared to short range data units. In an embodiment, the PHY data units 300 and 320 are similar to the IEEE 802.11n PHY data unit 100 of FIG. 2, or to the IEEE 802.11ac PHY data unit 170 of FIG. 4, but are generated at a lower clock rate (e.g., in one embodiment where the transmitting device is a dual-mode device configured to generate both short range and long range data units, by down-clocking from the higher clock rate) and have a proportionally lower bandwidth (e.g., 2, 4, 8, or 16 MHz rather than 20, 40, 80 or 160 MHz when using a down-clocking factor of 10). In addition to the regular mode, in an embodiment, a low rate mode of the long range communication protocol further extends the range of communications. In an embodiment, the PHY data unit 340 is similar to the PHY data unit 300, but is limited to a lowest MCS. In some embodiments, the PHY data unit 340 is a "low bandwidth mode" data unit that is transmitted in a frequency band narrower than the smallest channel bandwidth of regular mode data units. For example, in one embodiment where the PHY data units 300 and 320 are transmitted in 2, 4, 8, or 16 MHz channels, the PHY data unit 340 is only transmitted in a 1 MHz band. Moreover, in some embodiments, the PHY data unit 340 utilizes bit-by-bit or block repetition of bits, thereby increasing robustness while further decreasing the data rate.

The PHY data unit 300 in the example embodiment of FIG. 6A includes a preamble with an STF 302, a first LTF (LTF1) 304, and a SIG field (SIGA) 306. In an embodiment, if more than one spatial stream is used to transmit the PHY data unit 300, the preamble also includes one or more additional LTFs (LTF2(s)) 310. In addition to the preamble, the PHY data unit 300 includes a data portion (DATA) 312, in an embodiment. The PHY data unit 320 in the example embodiment of FIG. 6B includes a preamble with an STF 322, a first LTF (LTF1) 324, and a first SIG field (SIGA) 326. In an embodiment, if more than one spatial stream is used to transmit the PHY data unit 320, the preamble also includes one or more additional LTFs (LTF2(s)) 330. Unlike the preamble of the PHY data unit 300 for SU mode, the preamble of the PHY data unit 320 for MU mode also includes a second SIG field (SIGB) 332, in an embodiment. In addition to the preamble, the PHY data unit 320 includes a data portion (DATA) 334, in an embodiment. Examples of regular mode, long range data units according to various embodiments are described in U.S. patent application Ser. No. 13/359,336, entitled "Physical Layer Frame Format for Long Range WLAN" and filed on Jan. 26, 2012, which is hereby incorporated by reference herein in its entirety. Examples of SU and MU preamble designs for long range data units according to various embodiments are described in U.S. patent application Ser. No. 13/464,467, entitled "Preamble Designs for Sub-1 GHz Frequency Bands" and filed on May 4, 2012, which is hereby incorporated by reference herein in its entirety.

The PHY data unit 340 in the example embodiment of FIG. 6C includes a preamble with an STF (LRP-STF) 342, a first LTF (LRP-LTF1) 344, and a SIG field (LRP-SIGA) 346. In one embodiment, the STF 342 is longer than the STF 302 of the PHY data unit 300. In an embodiment, if more than one spatial stream is used to transmit the PHY data unit 340, the preamble also includes one or more additional LTFs (LRP-LTF2(s)) 350. In other embodiments, multiple spatial streams are not permitted in the low rate PHY mode. In addition to the preamble, the PHY data unit 340 includes a data portion (DATA) 352, in an embodiment. In one embodiment, the SIG field 346 uses the same MCS as the data portion 352 (e.g., both use the lowest MCS permitted for regular mode PHY data units, in an embodiment). Examples of low rate mode, long range data units according to various embodiments are described in U.S. patent application Ser. No. 13/366,064, entitled "Control Mode PHY for WLAN" and filed on Feb. 3, 2012, which is hereby incorporated by reference herein in its entirety. In some embodiments, the PHY data unit 340 is a low bandwidth mode PHY data unit with a bandwidth less than (e.g., half of) the smallest channel bandwidth used to transmit regular mode PHY data units. Examples of low bandwidth mode, long range data units according to various embodiments are described in U.S. patent application Ser. No. 13/494,505, entitled "Low Bandwidth PHY for WLAN" and filed on Jun. 12, 2012, which is also hereby incorporated by reference herein in its entirety.

Although the PHY data units 300, 320, and/or 340 for long range communications are similar, in some embodiments, to PHY data units for short range communications (e.g., in embodiments where the PHY data units 300, 320 are similar to down-clocked versions of IEEE 802.11n or IEEE 802.11ac PHY data units), the various SIG fields of some or all of PHY data units 300, 320, and 340 differ from the SIG fields of short range data units. In particular, in some embodiments, the regular mode and/or low rate mode long range data units include SIG fields that contain fewer information bits than the corresponding SIG fields of short range data units, and/or the low rate mode PHY data units include SIG fields that contain fewer information bits than the corresponding SIG fields of regular mode PHY data units.

Tables 1-5 (below) show various example SIG subfield bit requirements for length or duration subfields of a SIG field, and various example lists of subfields (with bit counts) within a SIG field, for SU and MU regular mode, long range data units, according to different embodiments.

Various considerations can limit the degree to which the number of SIG field bits in a long range data unit may be reduced relative to SIG field bits in a short range data unit. For example, Table 1 below illustrates a number of bits needed in a subfield of a SIG field (e.g., SIG field 306 in FIG. 6A) to indicate the length of a data portion of an SU, regular mode PHY data unit (in bytes), for a range of possible bandwidths (each corresponding to a particular number of data bits per OFDM symbol) and a range of possible TxOP (transmit opportunity) time durations, according to an embodiment. The bit counts in Table 1 correspond to an example embodiment in which regular mode channel bandwidths may be 2, 4, 8, or 16 MHz, the maximum number of spatial streams ($N_{SS}$) is four, and the maximum MCS index value is 9 (corresponding to 256-QAM, 5/6 coding rate).

TABLE 1

| BW | Data bits per OFDM symbol (MCS = 9, 4SS) | TxOP (ms) | | | | |
|---|---|---|---|---|---|---|
| | | 3 | 5 | 10 | 15 | 20 |
| 2 | 1386 | 14 | 15 | 16 | 16 | 17 |
| 4 | 2880 | 15 | 16 | 17 | 18 | 18 |
| 8 | 6240 | 16 | 17 | 18 | 19 | 19 |
| 16 | 12480 | 17 | 18 | 19 | 20 | 20 |

Thus, as seen in Table 1, up to 20 bits are needed to represent the data portion length (in bytes) of an SU PHY data unit if the maximum PHY data unit time duration is 20 ms, for the example embodiment described above. In some embodiments and scenarios, however, MU PHY data units include longer data portions than SU PHY data units, and more bits would therefore be needed to represent the data portion length in bytes. Thus, in some embodiments, MU PHY data units include a SIG subfield that indicates a duration of the data portion in terms of the number of OFDM symbols, rather than indicating a length of the data portion in bytes. Table 2 below illustrates a number of bits needed in the subfield to indicate the duration (in OFDM symbols) of a data portion of an MU, regular mode PHY data unit, according to an embodiment. The bit counts in Table 2 correspond to an embodiment in which the first SIG field of an MU, regular mode PHY data unit (e.g., first SIG field 326 in FIG. 6B) indicates an "equivalent duration" of the data portion of the PHY data unit based on a lowest possible bandwidth and MCS of the regular mode (e.g., 2 MHz channel bandwidth, and MCS0 corresponding to BPSK modulation and rate ½ coding). In other embodiments, the SIG field indicates the actual duration in OFDM symbols of the data portion.

TABLE 2

| Data bits per OFDM symbol (MCS = 0, 2 MHz BW) | TxOP (ms) | | | | |
|---|---|---|---|---|---|
| | 3 | 5 | 10 | 15 | 20 |
| 26 | 8 | 9 | 10 | 11 | 11 |

Thus, as seen in Table 2, up to 11 bits are needed to represent the data portion equivalent duration (in OFDM symbols) of an MU PHY data unit if the maximum PHY data unit time duration is 20 ms, for the example embodiment described above.

Other considerations also place constraints on the number of SIG field bits in a long range data unit, or permit the number of SIG field bits in a long range data unit to be reduced. In one embodiment, a receiving device relies on the SIG field to determine a channel bandwidth of a long range data unit, and the SIG field therefore includes a number of information bits sufficient to indicate the channel bandwidth (e.g., two bits to indicate a 2, 4, 8, or 16 MHz channel bandwidth, or three bits to indicate a 1, 2, 4, 8, or 16 MHz channel bandwidth, etc.). Moreover, in some embodiments, a receiving device relies on the SIG field to determine whether a long range data unit includes an A-MPDU, and the SIG field therefore includes a subfield indicating whether aggregation is used (e.g., using one bit). In some embodiments, however, MU regular mode, long range data units always use aggregation, and the SIG fields of MU PHY data units therefore do not include an aggregation subfield.

Further, in some embodiments, long range data units can be either BCC or LDPC coded, and the SIG field of a long range data unit therefore includes a subfield indicating the coding type. In other embodiments, long range data units are only permitted to use a single type of coding, and no coding subfield is included in the SIG field. In some embodiments, the SIG field of long range data units also includes a subfield indicating whether the data unit is an SU or MU PHY data unit.

In some embodiments, the SIG field bit count in a long range data unit is reduced by reducing the number of CRC bits relative to short range data units. Techniques for reducing the CRC subfield bit count (e.g., from eight bits to four bits) are described in U.S. patent application Ser. No. 13/085,134, entitled "Error Detection in a Signal Field of a WLAN Frame Header" and filed on Apr. 12, 2011, which is hereby incorporated by reference herein in its entirety.

With considerations and techniques such as those described above taken into account, Table 3 below lists example bit counts in various subfields in SIG fields of SU and MU, regular mode, long range data units (e.g., SIG field 306 of FIG. 6A and first SIG field 326 of FIG. 6B, respectively), according to one embodiment. "N/A" entries correspond to omitted subfields (e.g., the SU SIG field of the embodiment does not include a Group ID subfield, etc.).

TABLE 3

| Subfield | SU | MU |
|---|---|---|
| Length | 20 | 11 |
| Tail bits | 6 | 6 |
| CRC | 4 | 4 |
| MCS | 4 | N/A |
| BW (2, 4, 8, 16 MHz) | 2 | 2 |
| Smoothing | 1 | N/A |
| Aggregation | 1 | N/A |
| STBC | 1 | 1 |
| Coding | 1 | 1 |
| Short GI | 1 | 1 |
| SU/MU | 1 | 1 |
| Group ID | N/A | 6 |
| $N_{STS}$ | 2 | 8 |
| No TxOP_PS | N/A | 1 |
| TOTAL | 44 | 42 |

The various subfields listed in Table 3 are similar to the like-named subfields of the IEEE 802.11n or IEEE 802.11ac Standards, in an embodiment, other than the noted differences in bit size for each subfield.

According to various different embodiments, the subfields listed above in Table 3 are placed in a different order than shown. For example, the tail bits subfield is the last subfield of the SIG field, and/or the BW subfield is the first subfield of the SIG field, etc., according to various embodiments. Moreover, certain subfield bit counts listed in Table 3 are different in other embodiments. For example, in one embodiment where regular mode PHY data units can only be transmitted in a 2 or 4 MHz channel bandwidth, the BW subfield includes only one information bit. As another example, in one embodiment, the CRC subfield includes eight rather than four bits. Further, in various embodiments, one or more of the subfields listed in Table 3 is/are omitted from the SIG field, and/or additional subfields not listed in Table 3 are included in the SIG field. For example, in one embodiment, regular mode PHY data units are only permitted to utilize a single coding type, and the coding subfield is therefore omitted. As another example, in one embodiment, the SU and/or MU SIG fields include one or more "reserved" subfields that do not indicate any PHY parameter, and/or are reserved for future definition. In some embodiments, the number of reserved bits is selected to ensure that the SU and MU SIG fields have the same bit length (e.g., in some embodiments corresponding to Table 3, the MU SIG field includes two more reserved bits than the SU SIG field).

In some embodiments where regular mode, long range data units include a first SIG field as seen in Table 3, a second SIG field is also included in MU PHY data units. Table 4 below lists example bit counts in various subfields of a second SIG field of an MU, regular mode, long range data unit (e.g., second SIG field 332 of FIG. 6B), according to one embodiment.

TABLE 4

| Subfield | BW (MHz) | | | |
|---|---|---|---|---|
| | 2 | 4 | 8 | 16 |
| Length | 16 | 17 | 18 | 19 |
| MCS | 4 | 4 | 4 | 4 |
| Tail bits | 6 | 6 | 6 | 6 |
| TOTAL | 26 | 27 | 28 | 29 |

In one embodiment, the second SIG field of Table 4 is included in the same regular mode, long range data unit as the first SIG field (for the MU case) of Table 3.

In the example second SIG field of Table 4, the length field indicates the user-specific data portion lengths in bytes, and the MCS subfield indicates the user-specific MCSs. In some embodiments, the subfields listed above in Table 4 are placed in different orders than shown. Moreover, certain bit counts listed in Table 4 are different in other embodiments. For example, in some embodiments, more or fewer than six tail bits are included in the tail bits subfield. Further, in various embodiments, one or more of the subfields listed in Table 4 is/are omitted from the second SIG field, and/or additional subfields not listed in Table 4 are included in the second SIG field. For example, in one embodiment, the second SIG field includes one or more "reserved" subfields that do not indicate any PHY parameter, and/or are reserved for future definition.

In a different example embodiment, the SIG fields of SU and MU, regular mode PHY data units (e.g., similar to SIG field 306 of FIG. 6A and first SIG field 326 of FIG. 6B, respectively) include the subfields and bit counts listed below in Table 5.

TABLE 5

| Subfield | SU | MU |
|---|---|---|
| Length/Duration | 9 | 9 |
| Tail bits | 6 | 6 |
| CRC | 4 | 4 |
| MCS | 4 | N/A |
| BW (2, 4, 8, 16 MHz) | 2 | 2 |
| Smoothing | 1 | N/A |
| Aggregation | 1 | N/A |
| STBC | 1 | 1 |
| Coding | 2 | 5 |
| Short GI | 1 | 1 |
| Group ID | N/A | 6 |
| $N_{STS}$ | 2 | 8 |
| Partial AID | 12 | N/A |
| Midamble/Doppler | 1 | N/A |
| TOTAL | 46 | 42 |

As shown above, the example SIG field of Table 5 differs in several respects from the example SIG field of Table 3. For example, the length/duration subfield in the SIG field of Table 5 includes only nine length bits for both SU and MU long range data units. In an embodiment, the length/duration subfield indicates a data portion length (e.g., in bytes) up to a particular length value (e.g., up to 511 bytes for 9 bits), and indicates duration in OFDM symbols for packets with data portions of greater length. In some embodiments, the aggregation subfield is used to indicate to a receiving device whether the length/duration subfield indicates length (e.g., in bytes) or duration in number of symbols. For example, in one embodiment, the length/duration subfield indicates length in bytes when the aggregation bit is equal to zero, and indicates duration in number of OFDM symbols when the aggregation bit is equal to one.

The SIG field of Table 5 also differs from the SIG field of Table 3 in that the coding subfield includes two bits for the SU long range data unit and five bits for the MU long range data unit. In an embodiment the coding subfield includes an extra bit to indicate whether the PHY data unit includes an extra OFDM symbol (e.g., in a manner similar to IEEE 802.11ac), and the MU coding subfield includes more bits than the SU coding subfield in order to indicate the coding type for each user.

Furthermore, unlike the SIG field of Table 3, the SIG field of Table 5 does not include an SU/MU subfield. In some embodiments, the SU/MU subfield is excluded because a device receiving the long range data unit can detect whether the long range data unit is SU or MU by other means. For example, in one embodiment, a receiving device can detect whether a long range data unit is SU or MU based on the type of modulation (e.g., BPSK versus quaternary BPSK (QBPSK)) used to modulate a portion of the long range data unit (e.g., used to modulate one or more OFDM symbols of a SIG field, in an embodiment).

The SIG field of Table 5 also differs from the SIG field of Table 3 in that the SIG field of Table 5 includes a partial AID subfield and a midamble/Doppler subfield. In an embodiment, the partial AID subfield indicates a value based on a basic service set identifier (BSSID) and an association identifier (AID) of the receiving device, and the midamble/Doppler subfield indicates whether the long range data unit includes a midamble. In some embodiments, a midamble is included (e.g., between portions of a data field of a PHY data unit) to permit more frequent channel estimation, which can be useful to combat rapidly changing channel conditions (e.g., in the presence of Doppler). In an embodiment, a midamble of a long range data unit includes one or more LTFs, and/or one or more STFs.

According to various different embodiments, the subfields listed above in Table 5 are placed in a different order than shown. For example, the tail bits subfield is the last subfield of the SIG field, and/or the BW subfield is the first subfield of the SIG field, etc., according to various embodiments. Moreover, certain subfield bit counts listed in Table 5 are different in other embodiments. For example, in one embodiment, the partial AID subfield includes only eight bits. As another example, in one embodiment, the CRC subfield includes eight rather than four bits. Further, in various embodiments, one or more of the subfields listed in Table 5 is/are omitted from the SIG field, and/or additional subfields not listed in Table 5 are included in the SIG field. For example, in one embodiment, long range data units are only permitted to utilize a single coding type, and the coding subfield is therefore omitted. As another example, in an embodiment, the SIG field includes an "ACK policy" subfield. Indication of ACK policy in the SIG field is described in U.S. patent application Ser. No. 13/586,678, filed on Aug. 15, 2012 and entitled "Long Range WLAN Data Unit Format," which is hereby incorporated by reference herein in its entirety. As yet another example, in one embodiment, the SU and/or MU SIG fields include one or more "reserved" subfields that do not indicate any PHY parameter, and/or are reserved for future definition. In some embodiments, the number of reserved bits is selected to ensure that the SU and MU SIG fields have the same bit length (e.g., in one embodiment corresponding to Table 5, the MU SIG field includes ten reserved bits and the SU SIG field includes six reserved bits, such that each SIG field includes a total of 52 bits).

In some embodiments where regular mode, long range data units include a first SIG field as seen in Table 5, a second SIG field (e.g., second SIG field 332 of FIG. 6B) is also included for MU PHY data units. For example, in one embodiment, the second SIG field is the same as or similar to the second SIG field of Table 4. In another example embodiment, the second SIG field excludes the length subfield, and includes an MCS subfield, a CRC subfield, and a tail bits subfield (e.g., with four, eight, and six bits, respectively), regardless of channel bandwidth.

In some embodiments, low rate mode PHY data units include SIG fields the same as or similar to the regular mode PHY data units (e.g., similar to any of the example regular mode SIG fields described above in connection with Tables 3-5). In other embodiments, however, low rate mode PHY data units include SIG fields with a reduced bit count relative to the SIG fields of regular mode PHY data units. A reduction in bit count may be particularly advantageous for SIG fields of low rate mode PHY data units, which generally utilize a larger number of OFDM symbols to transmit a given number of bits as compared to regular mode PHY data units (e.g., due to factors such as low MCS index value, bit repetition, etc., in various embodiments). Tables 6-9 (below) show various example SIG subfield bit requirements for length or duration subfields of a SIG field, and various example lists of subfields (with bit counts) within a SIG field, for low rate mode, long range data units, according to different embodiments.

Various considerations can limit the degree to which the number of SIG field bits in a low rate mode PHY data unit may be reduced relative to SIG fields of regular mode PHY data units. For example, Table 6 below illustrates a number of bits needed in a subfield of a low rate mode SIG field (e.g., SIG field 346 in FIG. 6C) to indicate the length of a data portion of a low rate mode PHY data unit (in bytes), for a range of possible bandwidths (each corresponding to a particular number of data bits per OFDM symbol) and a range of possible TxOP time durations, according to an embodiment. The subfield bit counts in Table 6 correspond to an example embodiment in which low rate mode channel bandwidths may be 1, 2, 4, or 8 MHz, the maximum number of spatial streams ($N_{SS}$) is one, the maximum MCS index value is 0 (corresponding to BPSK, ½ coding rate), and the low rate mode PHY data unit is generated using 2× repetition and with an FFT size half as large as the smallest FFT size used to generate regular mode PHY data units (e.g., a 32-point FFT, in an embodiment where regular mode uses a 64-point or greater FFT).

TABLE 6

| BW | Data bits per OFDM symbol (MCS = 0, 32 FFT with 2x repetition) | TxOP (ms) | | | | |
|---|---|---|---|---|---|---|
| | | 3 | 5 | 10 | 15 | 20 |
| 1 | 6.5 | 6 | 7 | 8 | 9 | 9 |
| 2 | 13.5 | 7 | 8 | 9 | 10 | 10 |
| 4 | 29.25 | 8 | 9 | 10 | 11 | 11 |
| 8 | 58.5 | 9 | 10 | 11 | 12 | 12 |

Thus, as seen in Table 6, up to 12 bits are needed to represent the data portion length (in bytes) of a low rate mode data unit if the maximum PHY data unit time duration is 20 ms, for the example embodiment described above.

Table 7 below illustrates a number of bits needed in a subfield of a low rate mode SIG field (e.g., SIG field 346 in FIG. 6C) to indicate the length of a data portion of a low rate mode PHY data unit (in bytes), according to another example embodiment. The bit counts in Table 7 correspond to an example embodiment in which low rate mode channel bandwidth is 1 MHz, the maximum number of spatial streams ($N_{SS}$) is eight, the maximum MCS index value is 0 (corresponding to BPSK, ½ coding rate), and the low rate mode PHY data unit is generated using 2× repetition and with an FFT size half as large as the smallest FFT size used to generate regular mode PHY data units (e.g., a 32-point FFT, in an embodiment where regular mode uses a 64-point or greater FFT).

TABLE 7

| $N_{SS}$ | Data bits per OFDM symbol (MCS = 0, 32 FFT with 2x repetition) | TxOP (ms) | | | | |
|---|---|---|---|---|---|---|
| | | 3 | 5 | 10 | 15 | 20 |
| 1 | 6.5 | 6 | 7 | 8 | 9 | 9 |
| 2 | 13.5 | 7 | 8 | 9 | 10 | 10 |
| 4 | 29.25 | 8 | 9 | 10 | 11 | 11 |
| 8 | 58.5 | 9 | 10 | 11 | 12 | 12 |

As was the case in Table 6, up to 12 bits are needed to represent the data portion length (in bytes) of a low rate mode PHY data unit if the maximum PHY data unit time duration is 20 ms, for the example embodiment described above. In still other embodiments, where low rate mode PHY data units are limited to 1 MHz channel bandwidth and only a single space-time stream, only nine bits are needed to represent the data portion length.

Other considerations also place constraints on the number of SIG field bits in a low rate mode PHY data unit, or permit the number of SIG field bits in a low rate mode PHY data unit to be reduced. For example, in various embodiments, the low rate mode does not permit aggregation, multi-user operation, STBC, multiple coding types, and/or power save mode (Tx_OP), thereby allowing the corresponding subfields to be omitted from the SIG field, and/or allowing only a single SIG field to be utilized (e.g., allowing a second SIG field to be omitted in embodiments where low rate mode does not permit MU PHY data units). As another example, in an embodiment, the low rate mode only permits a single MCS (e.g., the lowest MCS of regular mode, or an MCS lower than the lowest MCS of regular mode), thereby allowing the MCS subfield to be omitted. In some embodiments, the SIG field bit count is lowered by reducing the number of CRC bits, as discussed above for regular mode PHY data units.

With considerations and techniques such as those described above taken into account, Table 8 below lists example bit counts in various subfields in a SIG field of a low rate mode, long range data unit (e.g., SIG field 346 of FIG. 6C), according to one embodiment.

TABLE 8

| Subfield | LRP-SIG |
| --- | --- |
| Length | 12 |
| Tail bits | 6 |
| CRC | 4 |
| BW (2, 4, 8, 16 MHz) | 2 |
| TOTAL | 24 |

In some embodiments, the subfields listed above in Table 8 are placed in a different order than shown. For example, the tail bits subfield is the last subfield of the SIG field, and/or the BW subfield is the first subfield of the SIG field, etc., according to various embodiments. Moreover, certain bit counts shown in Table 8 are different, certain subfields shown in Table 8 are omitted, and/or additional subfields not shown in Table 8 are included, in various embodiments. For example, in one embodiment where the low rate mode only permits a 1 MHz channel bandwidth, the length subfield only includes nine information bits, and the SIG field excludes the BW subfield but includes coding and short GI subfields (e.g., containing one information bit each), and/or includes a reserved subfield (e.g., containing three bits). Table 9 below lists example bit counts in the low rate mode SIG field in another example embodiment, where the low rate mode is restricted to a single bandwidth (e.g., 1 MHz), and where the SIG field indicates additional types of PHY information to a receiving device.

TABLE 9

| Subfield | LRP-SIG |
| --- | --- |
| Length | 9 |
| Tail bits | 6 |
| CRC | 4 |
| Smoothing | 1 |
| Aggregation | 1 |
| STBC | 1 |
| Coding | 2 |
| Short GI | 1 |
| $N_{SS}$ | 2 |
| Midamble/Doppler | 1 |
| ACK Policy | 2 |
| TOTAL | 30 |

In various embodiments, the subfields are in a different order than shown in Table 9, certain bit counts are different than shown in Table 9, the SIG field excludes certain subfields shown in Table 9, and/or the SIG field includes additional subfields not shown in Table 9.

In embodiments described below with reference to FIGS. 7-12, the bit counts of SIG fields in long range data units are reduced as compared to SIG fields of short range data units (e.g., as compared to IEEE 802.11n and IEEE 802.11ac PHY data units) by more efficiently representing PHY information relating to sounding operations. Alternatively (or additionally), in some embodiments, the bit counts of SIG fields in low rate mode (e.g., low bandwidth mode) PHY data units are reduced as compared to SIG fields of regular mode PHY data units by more efficiently representing PHY information relating to sounding operations.

Generally, sounding utilizes "null data packets" (NDPs) that lack a data/payload portion in order to facilitate transmit beamforming via MIMO channel training. The IEEE 802.11n Standard specifies an NDP that is similar to the PHY data unit 100 of FIG. 2, but does not include the data portion 112. Likewise, the IEEE 802.11ac Standard specifies an NDP that is similar to the PHY data unit 170 of FIG. 4, but does not include the data portion 190. In an embodiment, NDPs conforming to a long range communication protocol have a format similar to data unit 300 of FIG. 6A (regular mode) or data unit 340 of FIG. 6C (low rate mode), but exclude the data portion 312 or data portion 352, respectively. Various example formats for NDPs of a long range communication protocol are described in U.S. patent application Ser. No. 13/477,920, entitled "Sounding Packet Format for Long Range WLAN" and filed on May 22, 2012, which is hereby incorporated by reference herein in its entirety.

Under the IEEE 802.11n and 802.11ac Standards, the parameter $N_{STS}$ in a data packet (referred to herein as "$N_{STS}$ for data") is a number of space-time streams, while the parameter $N_{STS}$ in an NDP (referred to herein as "$N_{STS}$ for sounding") is instead used to indicate the number of transmit antennas. In an embodiment, data packets of a long range communication protocol likewise use $N_{STS}$ to indicate the number of space-time streams in data packets, but to indicate the number of transmit antennas in NDPs. Under the IEEE 802.11n and 802.11ac Standards, a SIG field indicates $N_{STS}$ in the same way regardless of whether the packet is a data packet or an NDP. In particular, the SIG field of an IEEE 802.11n PHY data unit (whether a data packet or an NDP) indicates $N_{STS}$ by the combination of MCS and STBC subfields, and the SIG field of an IEEE 802.11ac PHY data unit (whether a data packet or an NDP) indicates $N_{STS}$ using a dedicated $N_{STS}$ subfield. As a result, in scenarios where the maximum permitted value of $N_{STS}$ for sounding is larger than the maximum permitted $N_{STS}$ for data (i.e., in scenarios where the maximum number of transmit antennas in sounding mode is greater than the maximum number of space-time streams in data mode), support of sounding operations can necessitate a higher SIG field bit count than would be needed for data packets alone. For example, in a system where $N_{STS}$ for data can only be one, but $N_{STS}$ for sounding can be any of one, two, three, or four, a dedicated $N_{STS}$ subfield (e.g., as in IEEE 802.11ac) would include two extra bits than would be needed to indicate $N_{STS}$ for data.

In the embodiments described below with reference to FIGS. 7-12, one or more SIG subfields are overloaded with PHY information such that the SIG field can indicate a larger range of $N_{STS}$ for sounding values (as compared to the range of $N_{STS}$ for data values) without a correspondingly larger number of SIG field bits. For ease of explanation, the designs and techniques of FIGS. 7-12 are described with reference to low rate mode, long range data units. In some embodiments, however, the designs and techniques of FIGS. 7-12 are more specifically applied to low bandwidth mode PHY data units. Moreover, in various other embodiments, the designs and techniques of FIGS. 7-12 are instead applied to all long range data units (e.g., both regular mode and low rate mode), and/or are applied to other types of PHY data units.

Figure 7:
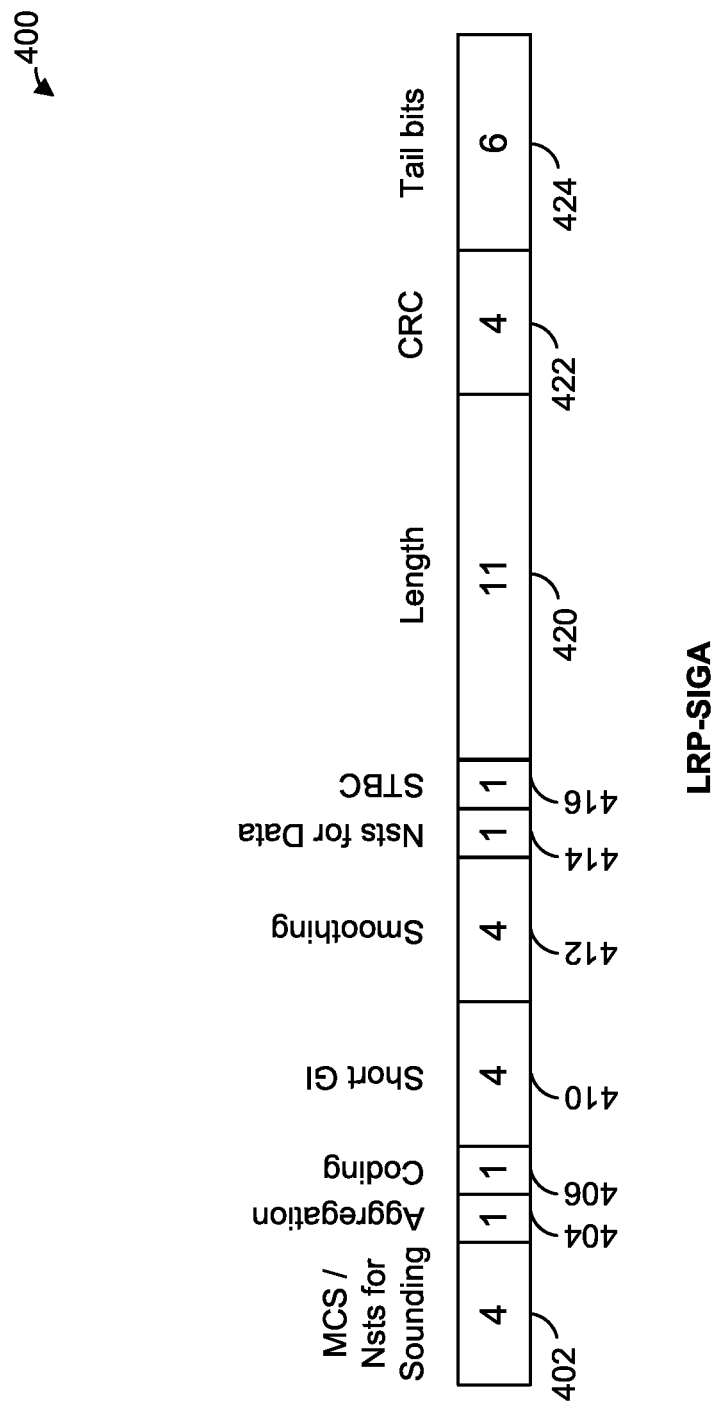
FIG. 7 is a diagram of an example SIG field format of a long range PHY data unit in low rate mode, according to an embodiment.

FIG. 7 illustrates a format of an example SIG field 400 of a low rate mode, long range data unit, according to an embodiment. In an embodiment, the SIG field 400 is included in the PHY data unit 340 of FIG. 6C in the location of SIG field 346. The SIG field 400 is included in both data packets and NDPs, in an embodiment. In the example embodiment of FIG. 7, the SIG field 400 includes an MCS/$N_{STS}$ for sounding subfield 402, an aggregation subfield 404, a coding subfield 406, a short GI subfield 410, a smoothing subfield 412, an $N_{STS}$ for data subfield 414, an STBC subfield 416, a length subfield 420, a CRC subfield 422, and a tail bits subfield 424. Bit counts of each subfield, according this embodiment, are shown in each respective subfield of FIG. 7 (e.g., four bits in MCS/$N_{STS}$ for sounding subfield 402, one bit in aggregation subfield 404, etc.).

In the SIG field 400, the function of the MCS/$N_{STS}$ for sounding subfield 402 is dependent on the length value (e.g., in bytes) indicated by the information bits in length subfield 420. For example, in an embodiment, the PHY data unit is an NDP, and the subfield 402 indicates the $N_{STS}$ for sounding associated with the NDP, if the length subfield 420 indicates a zero length data portion. Conversely, in this embodiment, the PHY data unit is a data packet, and the MCS/$N_{STS}$ for sounding subfield 402 indicates the MCS for the data packet, if the length subfield 420 instead indicates a non-zero length data portion. Thus, a receiving device can determine the function of the MCS/$N_{STS}$ for sounding subfield 402 by analyzing the information bits in the length subfield 420. In this manner, no extra information bits are needed in the SIG field 400 to represent $N_{STS}$ for sounding, even in systems where the maximum $N_{STS}$ for sounding is greater than the maximum $N_{STS}$ for data. In other embodiments, one or more subfields other than the MCS subfield 402 are instead (or additionally) repurposed when the length value in length subfield 420 is zero. For example, in various embodiments, information bits from one or more of the MCS subfield 402, aggregation subfield 404, coding subfield 406, short GI subfield 410, and STBC subfield 416 are used to represent $N_{STS}$ for sounding when the length subfield 420 indicates a zero length data portion. In some embodiments, only a subset of the information bits in the repurposed subfield(s) is used to indicate $N_{STS}$ for sounding. For example, in one embodiment where the maximum $N_{STS}$ for sounding is four (i.e., $N_{STS}$ for sounding may be represented by only two bits), but the MCS/$N_{STS}$ for sounding subfield 402 requires four bits to indicate the MCS index value of a data packet, only two of the four bits in MCS/$N_{STS}$ for sounding subfield 402 are utilized to indicate $N_{STS}$ for sounding when generating an NDP.

In some embodiments, one or more SIG subfields other than (or in addition to) the length MCS subfield 420 is/are used to determine whether a PHY data unit has a data portion or is an NDP (and, therefore, whether the MCS subfield 402 and/or other subfields is/are repurposed), in an embodiment. Moreover, in some embodiments, sounding-related PHY information other than $N_{STS}$ for sounding is instead (or additionally) indicated in the MCS subfield 402 (and/or other subfield(s)) when repurposed for an NDP.

Other subfields in the SIG field 400 are omitted, or include different numbers of information bits than shown, in various other embodiments. For example, in an embodiment where low rate mode PHY data units with data portions are not permitted to include multiple space-time streams, the $N_{STS}$ for data subfield 414 is omitted. As other examples, any of the MCS subfield 402, aggregation subfield 404, coding subfield 406, short GI subfield 410, smoothing subfield 412, and/or STBC subfield 416 are omitted in embodiments where the corresponding subfield(s) is/are not utilized for low rate mode PHY data units, so long as at least one subfield remains that can be repurposed for $N_{STS}$ for sounding. For example, in one embodiment where low rate mode PHY data units can only utilize a single MCS, the MCS subfield 402 is omitted, and the short GI subfield 410 is instead repurposed to indicate $N_{STS}$ for sounding when the length subfield 420 indicates a zero length value.

Figure 8:
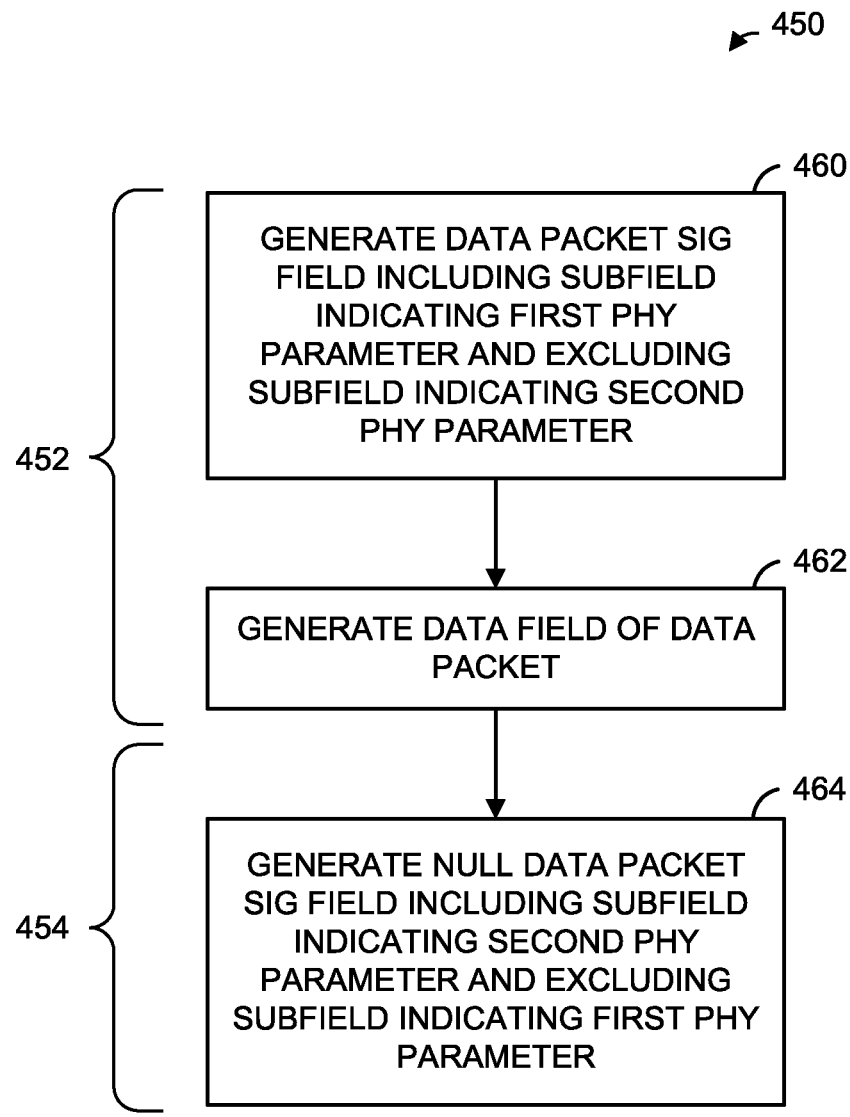
FIG. 8 is a flow diagram of an example method for generating data packets and null data packets for transmission in a wireless communication system, according to an embodiment.

FIG. 8 is a flow diagram of an example method 450 for generating data packets and NDPs for transmission in a wireless communication system, according to an embodiment. The method 450 is implemented in a network interface (such as the network interface 16 of AP 14 of FIG. 1, or the network interface 27 of client station 25-1 of FIG. 1, for example), in an embodiment. Generally, a data packet is generated at section 452 of method 450, and an NDP is generated at section 454 of method 450. In one embodiment, the data packet is a low rate mode PHY data unit similar to low rate mode PHY data unit 340 of FIG. 6C, and the NDP is a low rate mode PHY data unit similar to low rate mode PHY data unit 340, but with the data portion 352 omitted. In another embodiment, the data packet is a regular mode PHY data unit similar to regular mode PHY data unit 300 of FIG. 6A, and the NDP is a regular mode PHY data unit similar to regular mode PHY data unit 300, but with the data portion 312 omitted. In still other embodiments, the data packet and NDP are other types of PHY data units.

At block 460, a SIG field of the data packet is generated. The SIG field includes a subfield that indicates a particular first PHY parameter to a receiving device (i.e., a subfield that a receiving device can analyze to determine the value of the first PHY parameter for the data packet), and excludes any subfield indicating a particular second PHY parameter to a receiving device. In some embodiments, the first PHY parameter is a PHY parameter that is generally associated with data packets but not NDPs, and the second PHY parameter is a PHY parameter that is generally associated with NDPs but not data packets. For example, in various embodiments, the first PHY parameter is any one of MCS (e.g., MCS index of the data packet), coding type (e.g., whether BCC or LDPC coding is used for the data packet), aggregation information (e.g., whether aggregation is used for the data packet), STBC information (e.g., whether STBC is used for the data packet), and short GI information (e.g., whether a short or long guard interval is used for the data packet), and the second PHY parameter is $N_{STS}$ for sounding. In some embodiments, the subfield indicating the second PHY parameter is "excluded" from the SIG field simply by virtue of not being included in the SIG field, without necessarily making a separate, specific determination of whether to include or exclude the subfield indicating the second PHY parameter. In various embodiments, one or more additional subfields are included in the SIG field generated at block 460 (e.g., length, CRC, and/or tail bit subfields, for example).

At block 462, a data field of the data packet is generated. In an embodiment where the SIG field generated at block 460 includes a length subfield, the length of the data field generated at block 462 corresponds to the value indicated in the length subfield (e.g., in bytes, or number of OFDM symbols, etc., according to various embodiments).

At block 464, a SIG field of the NDP is generated. The SIG field of the NDP includes a subfield indicating the second PHY parameter (i.e., the PHY parameter for which no subfield is included in the SIG field generated at block 462, such as $N_{STS}$ for sounding, for example), and excludes any subfield indicating the first PHY parameter (i.e., the PHY parameter included in the subfield generated at block 460, such as MCS, for example).

In some embodiments, a long range communication protocol defines the subfield indicating the first PHY parameter in the data packet (generated at block 460) and the subfield indicating the second PHY parameter in the data packet (generated at block 464) as the same subfield (e.g., as occupying the same bit position(s) within the SIG field, with either the first or second PHY parameter being indicated by the subfield based on whether the packet is a data packet or NDP, respectively). Thus, in these embodiments, a subfield indicating the first PHY parameter for PHY data units that are data packets is effectively repurposed to indicate the second PHY parameter for PHY data units that are NDPs. In some of these embodiments, only a subset of the information bits in the data packet subfield indicating the first PHY parameter are repurposed to indicate the second PHY parameter in an NDP. In other of these embodiments, all of the information bits in the data packet subfield indicating the first PHY parameter are repurposed to indicate the second PHY parameter in an NDP.

In some embodiments, the data packet SIG field generated at block 460 additionally includes a subfield that indicates a third PHY parameter to a receiving device, and the NDP SIG field generated at block 464 additionally includes a subfield that indicates the same, third PHY parameter to a receiving device. For example, in one embodiment, both the data packet SIG field and the NDP SIG field include a length subfield. In this embodiment, generating the data packet includes setting the length subfield to a non-zero value that corresponds to the length of the data field generated at block 462, and generating the NDP includes setting the length subfield to zero.

In some embodiments, the method 450 includes additional blocks not shown in FIG. 8. For example, in one embodiment, the method 450 includes a block in which an STF of the data packet is generated, a block in which one or more LTFs of the data packet are generated, a block in which an STF of the NDP is generated, and a block in which one or more LTFs of the NDP are generated.

Figure 9:
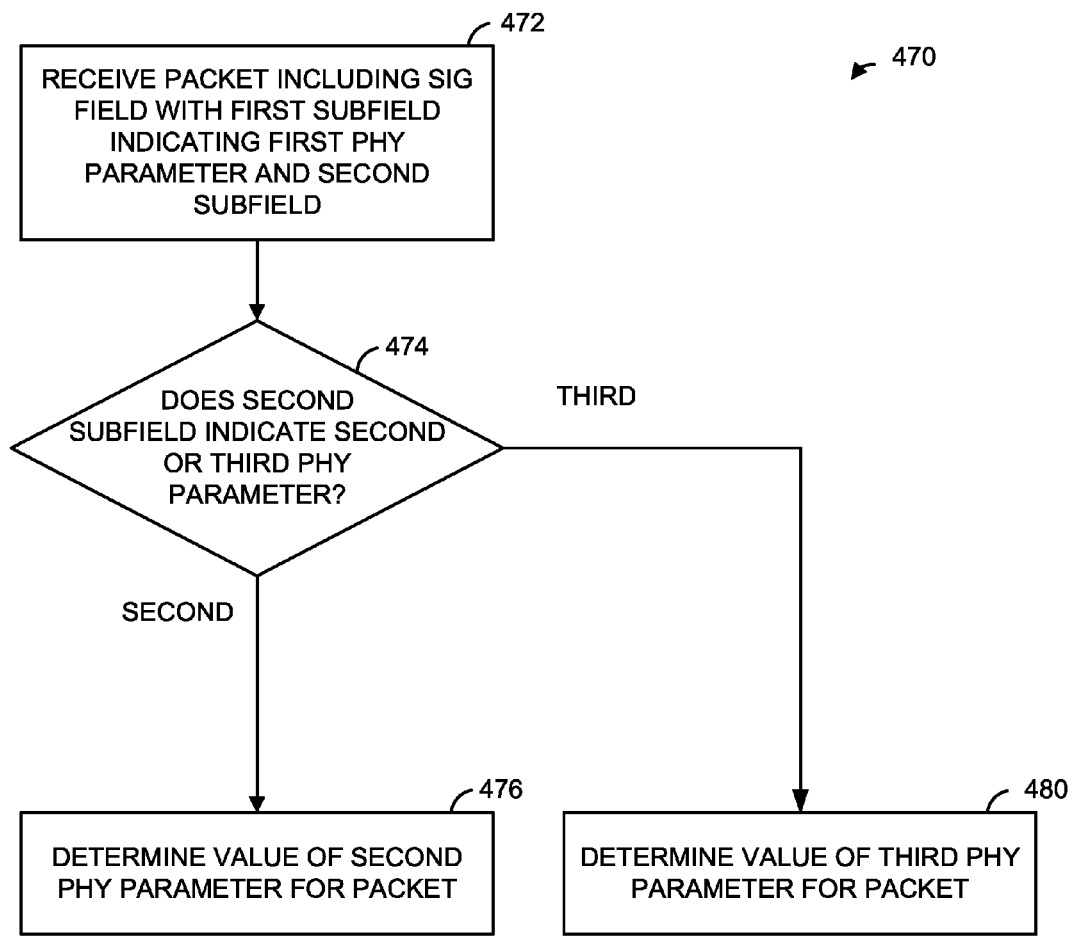
FIG. 9 is a flow diagram of an example method for detecting PHY information in received packets, according to an embodiment.

FIG. 9 is a flow diagram of an example method 470 for detecting PHY information in received packets, according to an embodiment. The method 470 is implemented in a network interface (such as the network interface 16 of AP 14 of FIG. 1, or the network interface 27 of client station 25-1 of FIG. 1, for example), in an embodiment. In one embodiment and scenario where the method 450 of FIG. 8 is implemented in the network interface 16 of AP 14 to generate PHY data units, the method 470 of FIG. 9 is implemented in the network interface 27 of client station 25-1 to detect PHY information in those data units (or vice versa).

At block 472, a packet is received. The received packet includes a SIG field that includes at least a first subfield and a second subfield, and the first PHY parameter indicates a first PHY parameter. In one embodiment, the received packet is a low rate mode PHY data unit similar to low rate mode PHY data unit 340 of FIG. 6C, with the data portion 352 omitted if the received packet is an NDP. In another embodiment, the received packet is a regular mode PHY data unit similar to regular mode PHY data unit 300 of FIG. 6A, with the data portion 312 omitted if the received packet is an NDP. In still other embodiments, the received packet is a different type of PHY data unit. In one embodiment, the first PHY parameter indicated by the first subfield of the received packet is a length of a data portion of the received packet, where the length is a non-zero value for data packets and zero for NDPs. In other embodiments, the first PHY parameter is a different PHY parameter suitable for use by a receiving device in distinguishing whether the received packet is a data packet or NDP.

At block 474, it is determined whether the second subfield of the SIG field in the packet received at block 472 indicates a second PHY parameter or a third PHY parameter. In some embodiments, the second PHY parameter is a PHY parameter associated with data packets but not NDPs, and the third PHY parameter is a PHY parameter associated with NDPs but not data packets. For example, in various embodiments, the second PHY parameter is one of MCS, coding type, aggregation information, STBC information, and short GI information, and the third PHY parameter is $N_{STS}$ for sounding.

The determination at block 474 is based on information bits included in the first subfield in the SIG field of the packet received at block 472. For example, in an embodiment where the first subfield is a length subfield, it is determined at block 474 that the second subfield indicates the second PHY parameter if the information bits in the length subfield indicate a length value corresponding to a data packet (e.g., a non-zero length, or a length above some minimum data portion length for data packets, etc.), and that the second subfield indicates the third PHY parameter if the information bits in the length subfield indicate a zero length value (i.e., if the length corresponds to an NDP that has no data portion).

If it is determined at block 474 that the second subfield indicates the second PHY parameter, flow proceeds to block 476. At block 476, a value of the second PHY parameter is determined for the packet received at block 472, based on the information bits of the second subfield. For example, in an embodiment where the second PHY parameter is MCS, the MCS of the packet received at block 472 is determined.

If it is instead determined at block 474 that the second subfield indicates the third PHY parameter, flow proceeds to block 480. At block 480, a value of the third PHY parameter is determined for the packet received at block 472, based on the information bits of the second subfield. For example, in an embodiment where the third PHY parameter is $N_{STS}$ for sounding, the $N_{STS}$ for sounding value of the packet received at block 472 is determined.

In some embodiments, the number of information bits used to make the determination at block 476 is less than the number of information bits used to make the determination at block 480, or vice versa. In other embodiments, the same number of information bits is used in blocks 476 and 580

In some scenarios, the method 470 is repeated for each of a plurality of packets that includes both data packets and NDPs. Moreover, in some embodiments, the method 470 includes additional blocks not shown in FIG. 9. For example, in one embodiment, the received packet includes a third subfield indicating either a fourth PHY parameter or a fifth PHY parameter, and the method 470 includes a block in which it is determined whether the third subfield indicates the fourth PHY parameter or the fifth PHY parameter. For example, in an embodiment, the fourth PHY parameter is an additional PHY parameter associated with data packets but not NDPs, and the fifth PHY parameter is an additional PHY parameter associated with NDPs but not data packets, and the determination of which PHY parameter is indicated by the third subfield is made based on a determination of whether the received packet is a data packet or NDP (e.g., based on a length subfield value).

Figure 10:
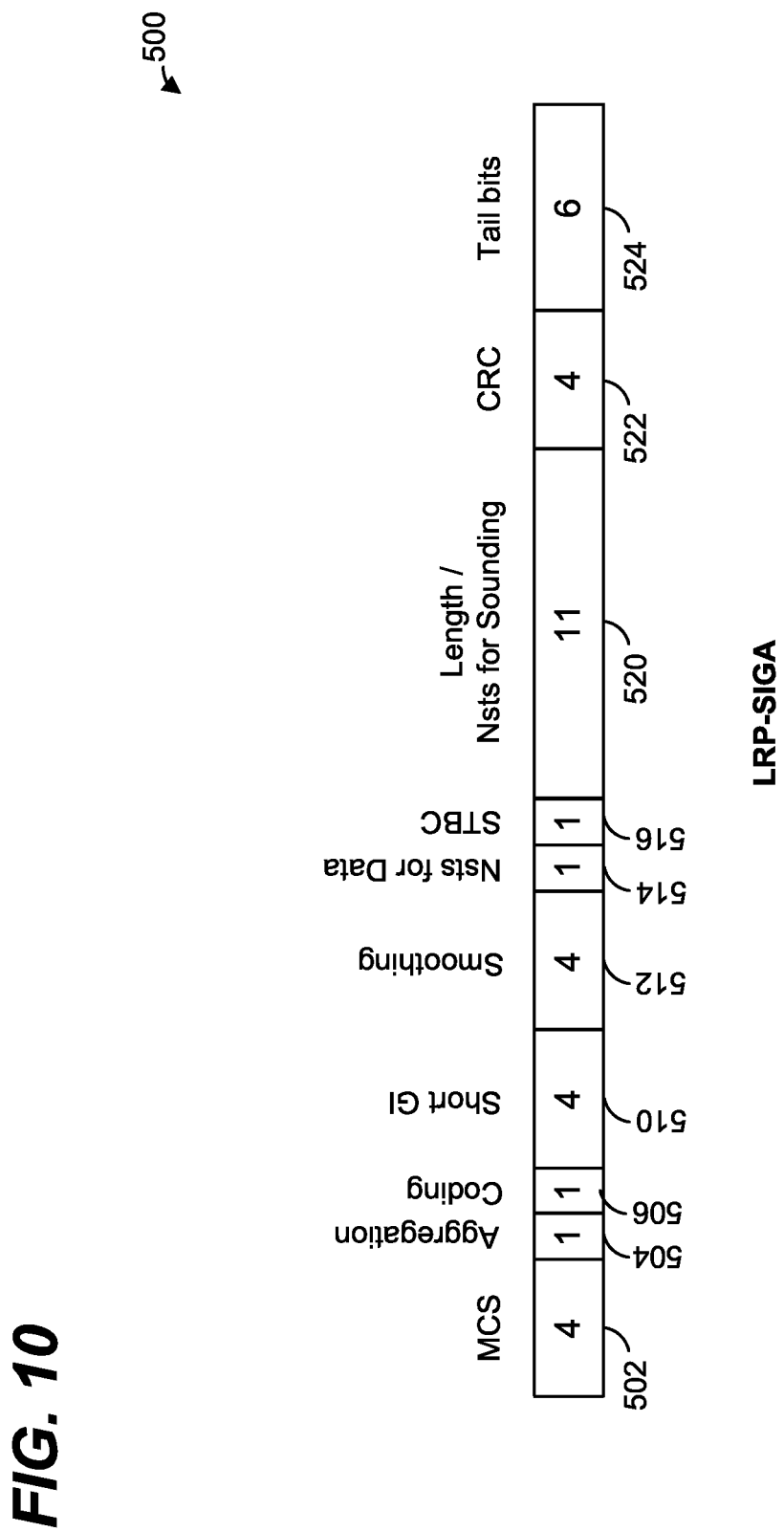
FIG. 10 is a diagram of an example SIG field format of a long range PHY data unit in low rate mode, according to another embodiment.

FIG. 10 illustrates a format of an example SIG field 500 of a low rate mode, long range data unit according to another embodiment. In an embodiment, the SIG field 500 is included in the PHY data unit 340 of FIG. 6C in the location of SIG field 346. The SIG field 500 is included in both data packets and NDPs, in an embodiment. In the example embodiment of FIG. 10, the SIG field 500 includes an MCS subfield 502, an aggregation subfield 504, a coding subfield 506, a short GI subfield 510, a smoothing subfield 512, an $N_{STS}$ for data subfield 514, an STBC subfield 516, a length/$N_{STS}$ for sounding subfield 520, a CRC subfield 522, and a tail bits subfield 524. Bit counts of each subfield, according this embodiment, are shown in each respective subfield of FIG. 10 (e.g., four bits in MCS subfield 502, etc.).

The length/$N_{STS}$ for sounding subfield 520 of the example SIG field 500 generally indicates the length of a data portion of the PHY data unit (e.g., in bytes). Certain length values, however, correspond to an NDP. In some embodiments, any length value that is less than a minimum possible data portion length of a data packet indicates that the PHY data unit is an NDP. For example, in one embodiment where the sounding subfield 520 indicates a data portion length in bytes, and where all data packets include a data portion that is at least three bytes long (e.g., to allow for a service field, a MAC header, and/or other information in the data portion), a length value of zero, one, or two bytes in the sounding subfield 520 indicates that the packet is an NDP. In the example SIG field format of FIG. 10, the fact that multiple length values correspond to an NDP is exploited to overload sounding subfield 520 with additional PHY information. In particular, in an embodiment, two or more length values that do not correspond to permissible lengths of data portions of data packets are mapped to two or more $N_{STS}$ for sounding values. For example, in one embodiment where all data packets include data portions of at least three bytes in length, a length value of zero bytes indicates an NDP with $N_{STS}$=2, a length value of one byte indicates an NDP with $N_{STS}$=3, a length value of two bytes indicates an NDP with $N_{STS}$=4, and a length value of greater than two bytes indicates a data packet having a data portion with the specified length value. In this manner, no extra information bits are needed to represent $N_{STS}$ for sounding, even in systems where the maximum $N_{STS}$ for sounding is greater than the maximum $N_{STS}$ for data.

In other embodiments, sounding-related PHY information other than $N_{STS}$ for sounding is instead (or additionally) indicated by length values less than a minimum permissible data portion length. Moreover, in some embodiments, values of $N_{STS}$ for sounding (or another sounding-related PHY parameter) are instead (or additionally) indicated by length values other than lengths less than a minimum allowed data portion length. For example, in one embodiment where the sounding subfield 520 is 11 bits long and indicates length in bytes (i.e., representing a length value range of zero to 2047 bytes), and where data portions of data packets are only permitted to be at least three bytes but no more than 2046 bytes, length values of 0, 1, 2, and 2047 are mapped to different values of $N_{STS}$ for sounding.

Other subfields in the example SIG field 500 are omitted, or include different numbers of information bits than shown, in various other embodiments. For example, in an embodiment where low rate mode PHY data units with data portions are not permitted to include multiple space-time streams, the $N_{STS}$ for data subfield 514 is omitted. As other examples, any of the MCS subfield 502, aggregation subfield 504, coding subfield 506, short GI subfield 510, smoothing subfield 512, and/or STBC subfield 516 are omitted in embodiments where the corresponding subfield(s) is/are not utilized for low rate mode PHY data units. For example, in one embodiment where low rate mode PHY data units can only utilize a single MCS, the MCS subfield 502 is omitted.

Figure 11:
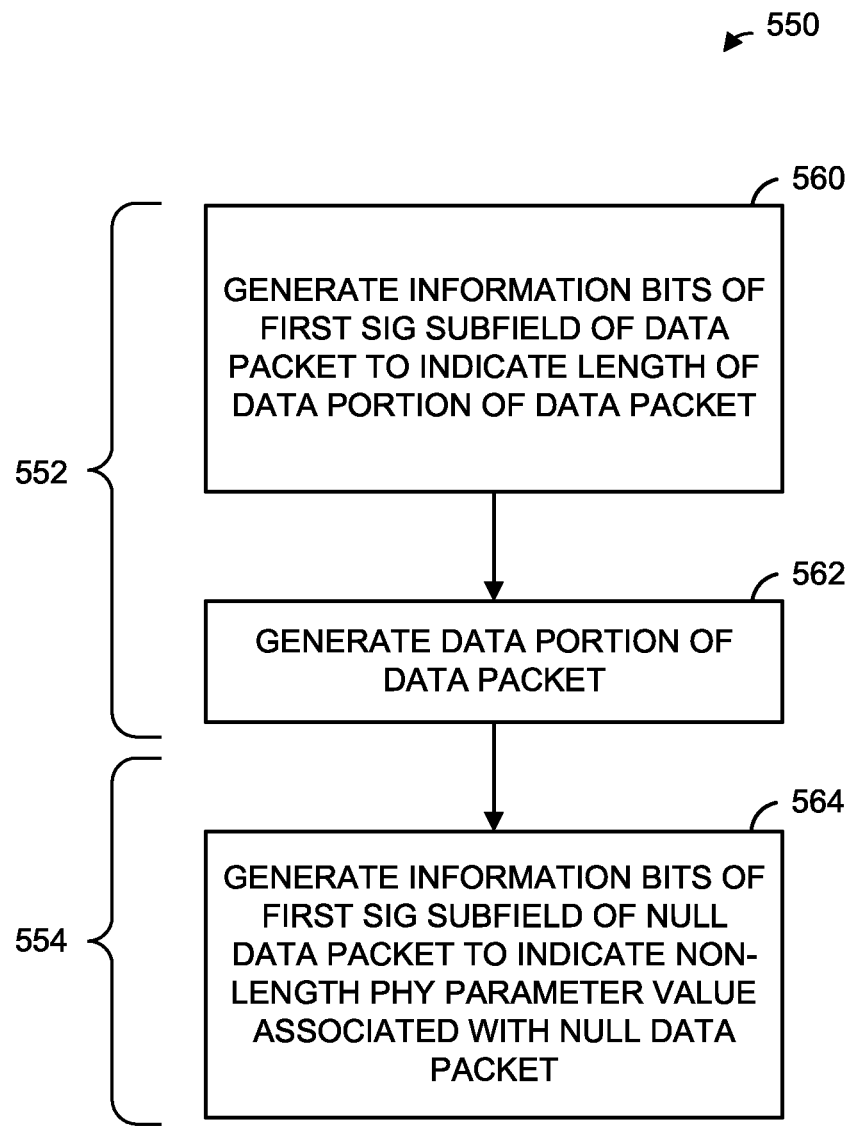
FIG. 11 is a flow diagram of an example method for generating data packets and null data packets for transmission in a wireless communication system, according to another embodiment.

FIG. 11 is a flow diagram of an example method 550 for generating data packets and NDPs for transmission in a wireless communication system, according to an embodiment. The method 550 is implemented in a network interface (such as the network interface 16 of AP 14 of FIG. 1, or the network interface 27 of client station 25-1 of FIG. 1, for example), in an embodiment. Generally, a data packet is generated at section 552 of method 550, and an NDP is generated at section 554 of method 550. In one embodiment, the data packet is a low rate mode PHY data unit similar to low rate mode PHY data unit 340 of FIG. 6C, and the NDP is a low rate mode PHY data unit similar to low rate mode PHY data unit 340, but with the data portion 352 omitted. In another embodiment, the data packet is a regular mode PHY data unit similar to regular mode PHY data unit 300 of FIG. 6A, and the NDP is a regular mode PHY data unit similar to regular mode PHY data unit 300, but with the data portion 312 omitted. In still other embodiments, the data packet and NDP are other types of PHY data units. Each of the packets (including both data packets and NDPs) generated by the method 550 includes a first SIG subfield defined by a communication protocol such as a long range communication protocol, for example. In one embodiment, for example, the long range communication protocol defines the position of bits within the SIG field of each packet that are allotted to the first SIG subfield (regardless of whether the packet is a data packet or an NDP), such that a receiving device knows where to find the information contained in the first SIG subfield. Moreover, the long range communication protocol only permits data portions of data packets to have at least some minimum length greater than zero (e.g., at least a two byte length, or at least a three byte length, etc.), in an embodiment.

At block 560, information bits of the first SIG subfield of a data packet are generated to indicate to a receiving device a length of a data portion of the data packet, where the indicated length is at least the minimum length specified by the long range communication protocol. For example, in one embodiment, the information bits indicate a length in bytes of the data portion of the data packet. In various embodiments, information bits of one or more additional SIG subfields of the data packet are also generated at block 560 (e.g., information bits of CRC and/or tail bit subfields, for example).

At block 562, a data field of the data packet is generated. In an embodiment, the length of the data field corresponds to the length indicated by the information bits in the first SIG subfield generated at block 560. For example, in one embodiment and scenario where the first SIG subfield of the data packet indicates a length of 100 bytes, the data field generated at block 562 is 100 bytes long.

At block 564, information bits of the first SIG subfield of an NDP are generated to indicate to a receiving device a non-length PHY parameter value associated with the NDP. For example, in one embodiment, the information bits are generated to indicate an $N_{STS}$ for sounding value associated with the NDP. More generally, in various embodiments, the information bits of the first SIG subfield of the NDP are generated to indicate a value of a PHY parameter that is generally associated with NDPs, but not with data packets. In an embodiment, the information bits of the first SIG subfield of the NDP, while not utilized to indicate an actual length of a data portion, can be mapped to a length value that is less than a minimum permissible length of a data portion for a data packet. In various embodiments, information bits of one or more additional SIG subfields of the NDP are also generated at block 564 (e.g., information bits of CRC and/or tail bit subfields, for example).

In some embodiments, the method 550 includes additional blocks not shown in FIG. 11. For example, in one embodiment, the method 550 includes a block in which a second NDP is generated, at least in part by generating information bits of the first SIG subfield (e.g., as defined by the long range communication protocol) of the second NDP to indicate to a receiving device a non-length PHY parameter value associated with the second NDP. For example, in one embodiment and scenario, the non-length PHY parameter value associated with the first NDP is an $N_{STS}$ for sounding value of one, and the non-length PHY parameter value associated with the second NDP is an $N_{STS}$ for sounding value of two. In an embodiment, the information bits of the first SIG subfield of the second NDP, while not utilized to indicate an actual length of a data portion, can be mapped to a length value that is less than a minimum permissible length of a data portion for a data packet. For example, in one embodiment and scenario where the minimum permitted data portion length for a data packet is two bytes, the information bits of the first SIG subfield of the first NDP can be mapped to a length value of zero bytes, and the information bits of the first SIG subfield of the second NDP can be mapped to a length value of one byte.

Figure 12:
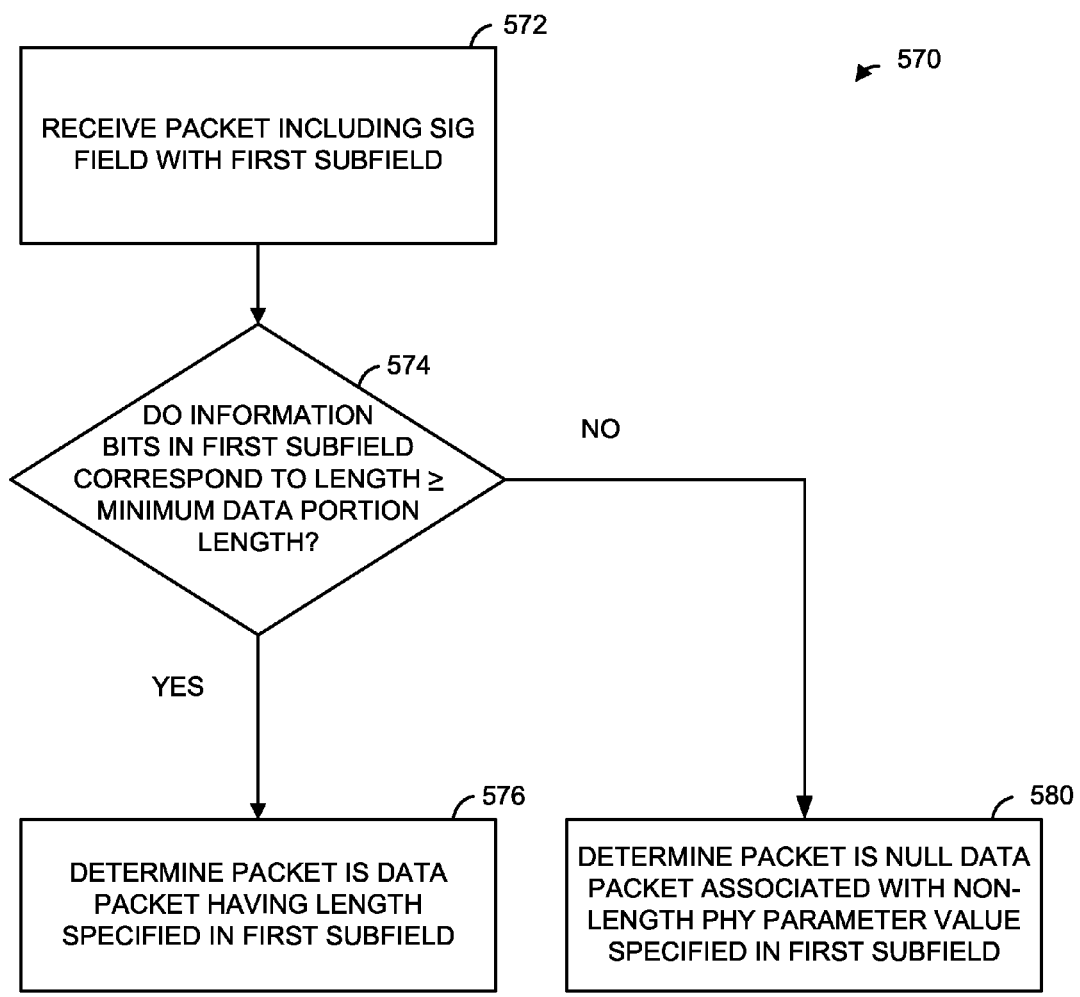
FIG. 12 is a flow diagram of an example method for detecting PHY information in received packets, according to another embodiment.

FIG. 12 is a flow diagram of an example method 570 for detecting PHY information in received packets, according to an embodiment. The method 570 is implemented in a network interface (such as the network interface 16 of AP 14 of FIG. 1, or the network interface 27 of client station 25-1 of FIG. 1, for example), in an embodiment. In one embodiment and scenario where the method 550 of FIG. 11 is implemented in the network interface 16 of AP 14 to generate PHY data units, the method 570 of FIG. 12 is implemented in the network interface 27 of client station 25-1 to detect PHY information in those data units (or vice versa).

At block 572, a packet is received. The received packet includes a SIG field that includes at least a first subfield. In an embodiment, the first subfield is defined by a long range communication protocol. For example, in one embodiment, the long range communication protocol defines the position of bits within the SIG field that are allotted to the first subfield, regardless of whether the SIG field is included in a data packet or an NDP. In one embodiment, the received packet is a low rate mode PHY data unit similar to low rate mode PHY data unit 340 of FIG. 6C, with the data portion 352 omitted if the received packet is an NDP. In another embodiment, the received packet is a regular mode PHY data unit similar to regular mode PHY data unit 300 of FIG. 6A, with the data portion 312 omitted if the received packet is an NDP. In still other embodiments, the received packet is a different type of PHY data unit.

At block 574, it is determined whether information bits in the first subfield of the SIG field in the packet received at block 572 correspond to a length value that is greater than or equal to the minimum length (e.g., in bytes) of a data portion of a data packet. In an embodiment, the minimum length is specified, and/or inherently required, by a long range communication protocol. In various embodiments, the minimum length is two bytes, three bytes, or some other suitable value (and/or some other suitable length unit). The determination at block 574 is based on information bits included in the first subfield in the SIG field of the packet received at block 572.

If it is determined at block 574 that the information bits correspond to a length value that is greater than or equal to the minimum length of a data portion of a data packet, flow proceeds to block 576. At block 576, it is determined that the packet received at block 572 is a data packet with a data portion having the length specified by the information bits of the first subfield.

If it is determined at block 574 that the information bits correspond to a length value that is less than the minimum length of a data portion of a data packet, flow proceeds to block 580. At block 580, it is determined that the packet received at block 572 is an NDP with a non-length PHY parameter value specified by the information bits of the first subfield. The non-length PHY parameter is a PHY parameter generally associated with NDPs but not associated with data packets, in an embodiment. For example, in one embodiment, the non-length PHY parameter is $N_{STS}$ for sounding.

In some scenarios, the method 570 is repeated for each of a plurality of packets that includes both data packets and NDPs. For example, in one embodiment and scenario, a first packet is received at block 572, it is determined that information bits in the first subfield of the first packet correspond to a first length greater than the minimum data portion length at block 574, and it is determined that the first packet is a data packet with a data portion having the first length at block 576. Continuing with this embodiment and scenario, a second packet is received at block 572, it is determined that information bits in the first subfield of the second packet correspond to a second length (e.g., zero bytes) less than the minimum data portion length at block 574, and it is determined that the second packet is an NDP associated with a first non-length PHY parameter value (e.g., a first $N_{STS}$ for sounding value) at block 580. Continuing still further with this embodiment and scenario, a third packet is received at block 572, it is determined that information bits in the first subfield of the third packet correspond to a third length (e.g., one byte) greater than the second length, but still less than the minimum data portion length, at block 574, and it is determined that the third packet is an NDP associated with a second non-length PHY parameter value (e.g., a second $N_{STS}$ for sounding value different than the first $N_{STS}$ for sounding value) at block 580.

In some of the embodiments described above with reference to FIGS. 7-12, the amount of overhead PHY information in each PHY data unit is further reduced by removing the SERVICE field from the PHY data unit, and including all (or a portion) of the scrambler seed in the SIG field. Example techniques for removing the SERVICE field and moving some or all of the scrambler seed to the SIG field are described in U.S. patent application Ser. No. 13/491,527, entitled "Physical layer Frame Format for Long Range WLAN" and filed on Jun. 7, 2012, which is hereby incorporated by reference herein in its entirety.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of generating a packet for transmission in a wireless communication system, wherein the packet includes a signal (SIG) field having a first SIG subfield, the method comprising:
   when the packet is of a data-type,
      setting the first SIG subfield of the packet to a first value greater than or equal to a minimum value to indicate, to a receiving device, (i) that the packet is of the data-type, and (ii) a first length corresponding to a data portion of the packet, and wherein the first length is at least a minimum length and the minimum value corresponds to the minimum length, and
      generating the data portion of the packet; and
   when the packet is of a null data-type,
      setting the first SIG subfield of the packet to a second value less than the minimum value to indicate, to the receiving device, (i) that the packet is of the null data-type, and (ii) a first physical layer (PHY) parameter value associated with the packet, and wherein the first PHY parameter value is not a length value.

2. A method according to claim 1, wherein the packet is a first packet, and wherein the method further comprises:
   generating a second packet of the null data-type, wherein generating the second packet includes
      setting a first SIG subfield of a SIG field of the second packet to a third value less than the minimum value to indicate, to the receiving device, (i) that the second packet is of the null data-type, and (ii) a second PHY parameter value associated with the second packet, and wherein
      the second PHY parameter value (i) is not a length value and (ii) is different than the first PHY parameter value.

3. A method according to claim 1, wherein:
   the minimum value is at least two,
   the second value is zero, and
   the third value is one.

4. A method according to claim 2, wherein:
   the first PHY parameter value is a first number of space-time streams, and
   the second PHY parameter value is a second number of space-time streams different than the first number of space-time streams.

5. A communication device comprising:
   a network interface device configured to generate a packet wherein the packet includes a signal (SIG) field having a first SIG subfield, at least in part by
      when the packet is of a data-type,
         setting the first SIG subfield of the packet to a first value greater than or equal to a minimum value to indicate, to a receiving device, (i) that the packet is of the data-type, and (ii) a first length corresponding to a data portion of the packet, and wherein the first length is at least a minimum length and the minimum value corresponds to the minimum length, and
      generating the data portion of the data packet, and
   when the packet is of a null data-type,
      setting the first SIG subfield of the packet to a second value less than the minimum value to indicate, to a receiving device, (i) that the packet is of a null data-type, and (ii) a first physical layer (PHY) parameter value associated with the packet, and wherein the first PHY parameter value is not a length value.

6. A communication device according to claim 5, wherein the first PHY parameter value is a number of space-time streams.

7. A method of detecting physical layer (PHY) information in received packets, the method comprising:
   receiving a plurality of packets including data packets and null data packets, wherein
      each of the data packets includes a data portion having at least a minimum length greater than zero,
      each of the null data packets does not include a data portion,
      each packet of the plurality of packets includes a signal (SIG) field, and
      the SIG field of each packet of the plurality of packets includes a first SIG subfield;
   determining, based on a first value of the first SIG subfield of a first packet of the plurality of packets being greater than or equal to a minimum value, that the first packet is (i) of a data-type, and (ii) includes a data portion having a first length equal to or greater than the minimum length and that corresponds to the first value;
   determining, based on a second value of the first SIG subfield of a second packet of the plurality of packets being less than the minimum value, that (i) the second packet is of a null data-type, and (ii) the second packet is associated with a first PHY parameter value that corresponds with the second value, wherein the first PHY parameter value is not a length value;
   determining, based on a third value of the first SIG subfield of a third packet of the plurality of packets being less than the minimum value, that (i) the third packet is of the null data-type, and (ii) the third packet is associated with a second PHY parameter value that corresponds with the third value, wherein the second PHY parameter value (i) is not a length value and (ii) is different than the first PHY parameter value.

8. A method according to claim 7, wherein:
   the first PHY parameter value is a first number of space-time streams, and
   the second PHY parameter value is a second number of space-time streams different than the first number of space-time streams.

9. A method according to claim 7, wherein:
   the minimum value is at least two,
   the second value is zero, and
   the third value is one.

10. A method according to claim 7, wherein:
    the first SIG subfield of the first packet is located at a first position within the SIG field of the first packet,
    the first SIG subfield of the second packet is located at the first position within the SIG field of the second packet, the first SIG subfield of the third packet is located at the first position within the SIG field of the third packet.

11. A communication device comprising:
a network interface device configured to
receive a plurality of packets including data packets and null data packets, wherein
each of the data packets includes a data portion having at least a minimum length greater than zero,
each of the null data packets does not include a data portion,
each packet of the plurality of packets includes a signal (SIG) field, and
the SIG field of each packet of the plurality of packets includes a first SIG subfield, and
determine that a respective packet of the plurality of packets is
(i) of a data-type including a data portion having a first length equal to or greater than the minimum length when the first SIG subfield of the respective packet is set to a first value greater than or equal to a minimum value corresponding to the minimum length,
(ii) of a null data-type and associated with a first PHY parameter value when the first SIG subfield of the respective packet is set to a second value less than the minimum value, wherein the first PHY parameter value is not a length value, or
(iii) of the null data-type and associated with a second PHY parameter value different than the first PHY parameter value when the first SIG subfield of the respective packet is set to a third value less than the minimum value, wherein the second PHY parameter value is not a length value.

12. A communication device according to claim 11, wherein:
the third value is greater than the second value.

13. A communication device according to claim 12, wherein:
the minimum value is at least two,
the second value is zero, and
the third value is one.

14. A communication device according to claim 11, wherein:
the first PHY parameter value is a first number of space-time streams, and
the second PHY parameter value is a second number of space-time streams different than the first number of space-time streams.

* * * * *